United States Patent [19]

Iwasaki et al.

[11] Patent Number: 5,587,026
[45] Date of Patent: Dec. 24, 1996

[54] FERROMAGNETIC FILM

[75] Inventors: Hitoshi Iwasaki; Yuichi Ohsawa; Reiko Kondoh, all of Yokohama, Japan

[73] Assignee: Kabushiki Kaisha Toshiba, Kawasaki, Japan

[21] Appl. No.: 498,231

[22] Filed: Jul. 5, 1995

Related U.S. Application Data

[63] Continuation of Ser. No. 188,747, Jan. 31, 1994, Pat. No. 5,484,491, which is a continuation of Ser. No. 954,042, Sep. 30, 1992, abandoned.

[30] Foreign Application Priority Data

Sep. 30, 1991 [JP] Japan ................................. 3-250674
Sep. 30, 1991 [JP] Japan ................................. 3-252448

[51] Int. Cl.⁶ ................................................. C22C 19/07
[52] U.S. Cl. ................................................. 148/313; 420/435
[58] Field of Search .................................. 148/313, 408, 148/425; 420/435

[56] References Cited

U.S. PATENT DOCUMENTS 3,983,916 10/1976 Henmi et al. ............................. 148/313

Primary Examiner—George Wyszomierski
Attorney, Agent, or Firm—Oblon, Spivak, McClelland, Maier & Neustadt, P.C.

[57] ABSTRACT

Disclosed is a ferromagnetic film consisting of an alloy represented by a formula $Co_xFe_yT_z$, where T is an element selected from the group consisting of Ta, Ti, Zr, Hf, Mo, and W, and x, y, and z represent atomic % and satisfy $73<x<94$, $5<y<15$, $1<z<12$, and $x+y+z=100$. This ferromagnetic film has high saturation magnetic flux density, and soft magnetism not to be degraded by high-temperature annealing, and which is suitably applied to a magnetic head.

9 Claims, 38 Drawing Sheets

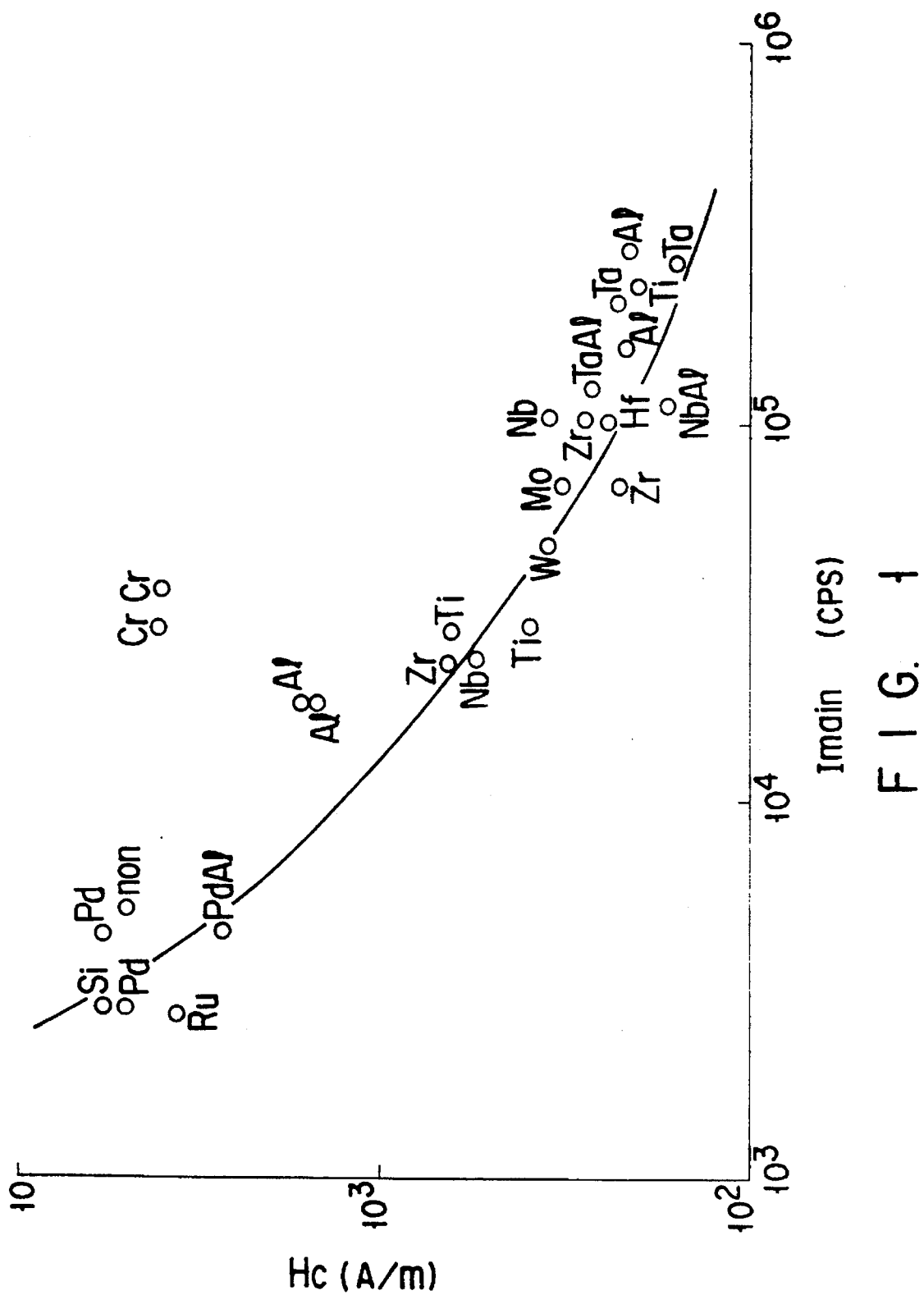

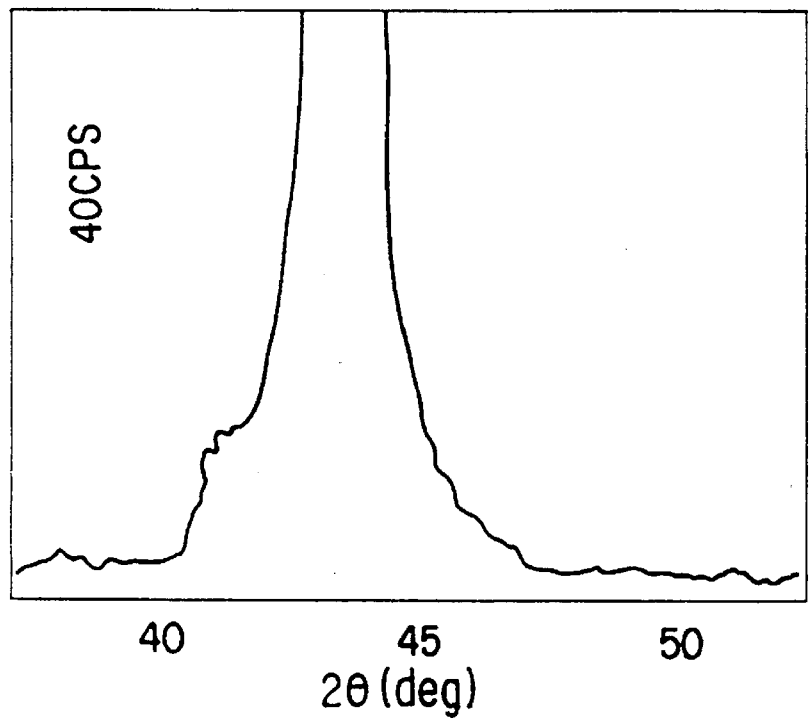
F I G. 2A
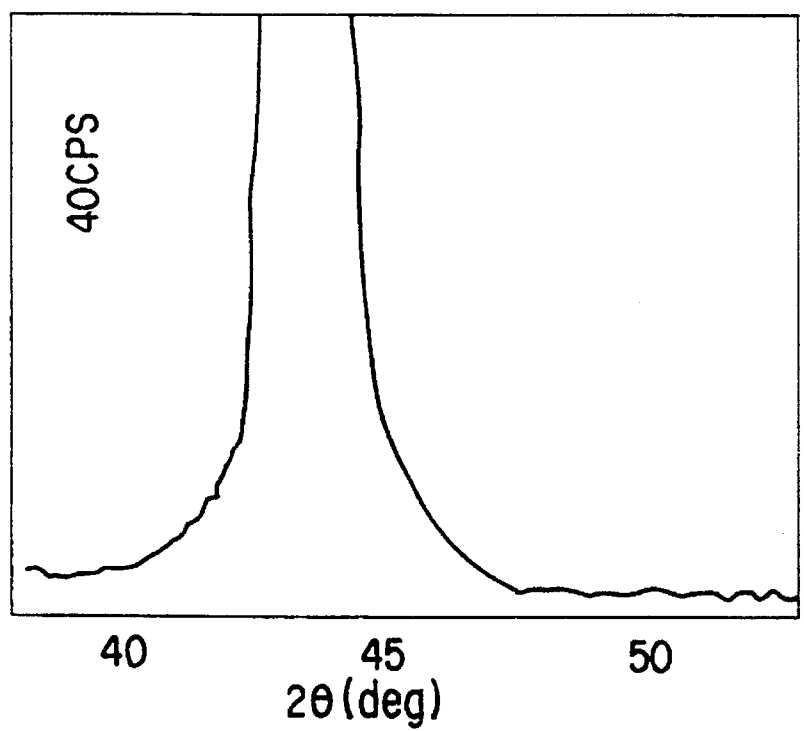
F I G. 2B

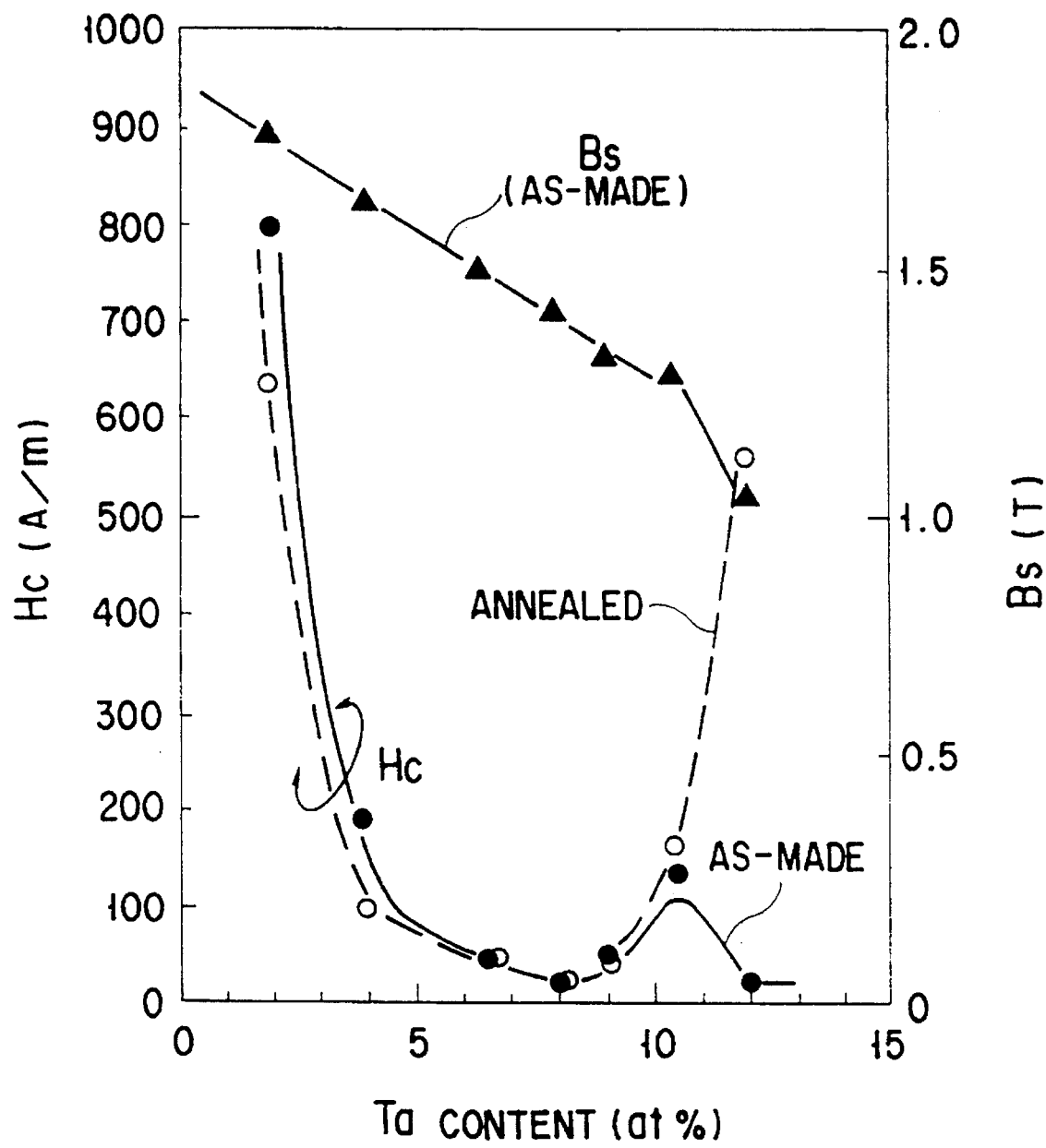
F I G. 5

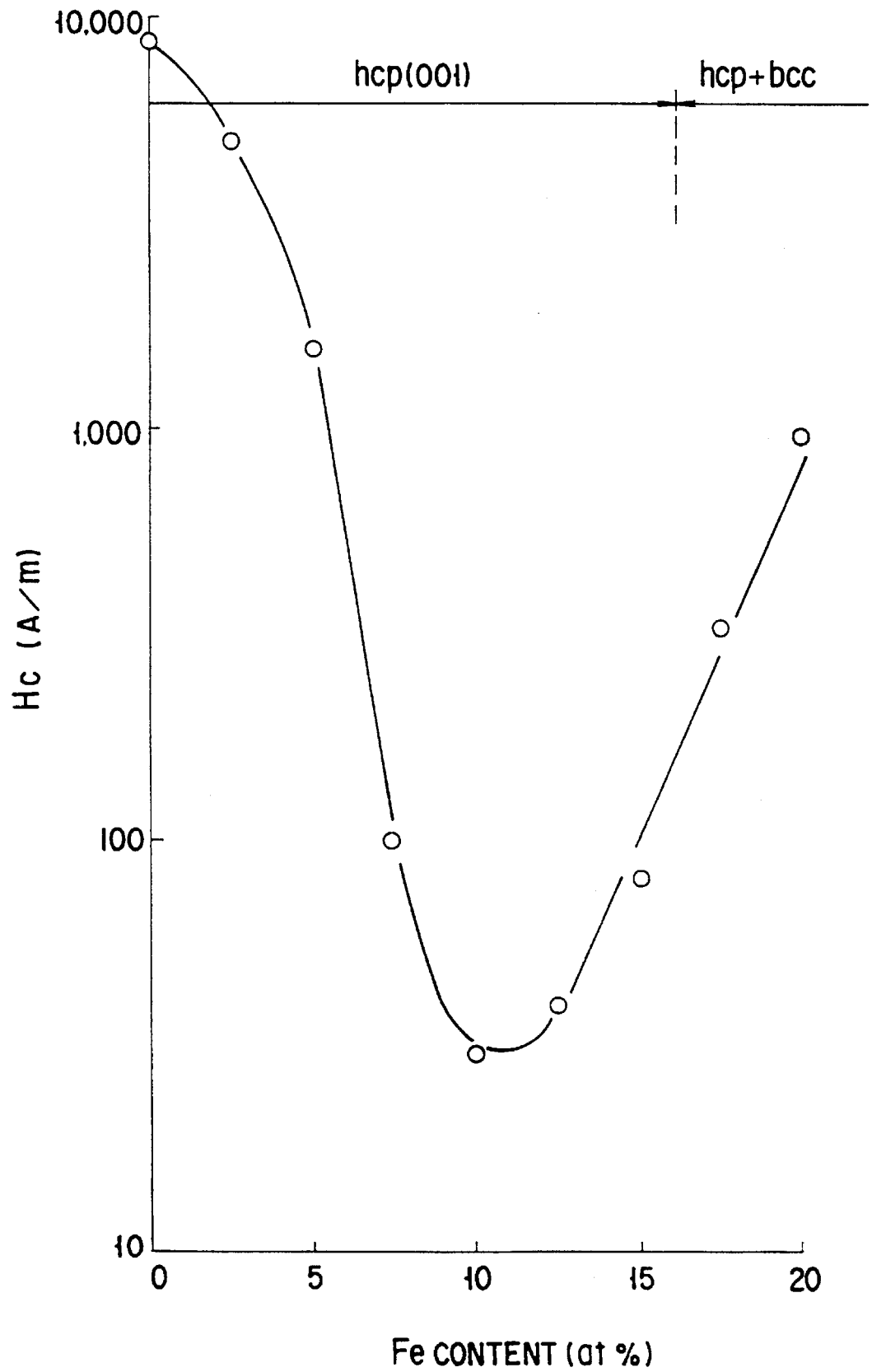
F I G. 6

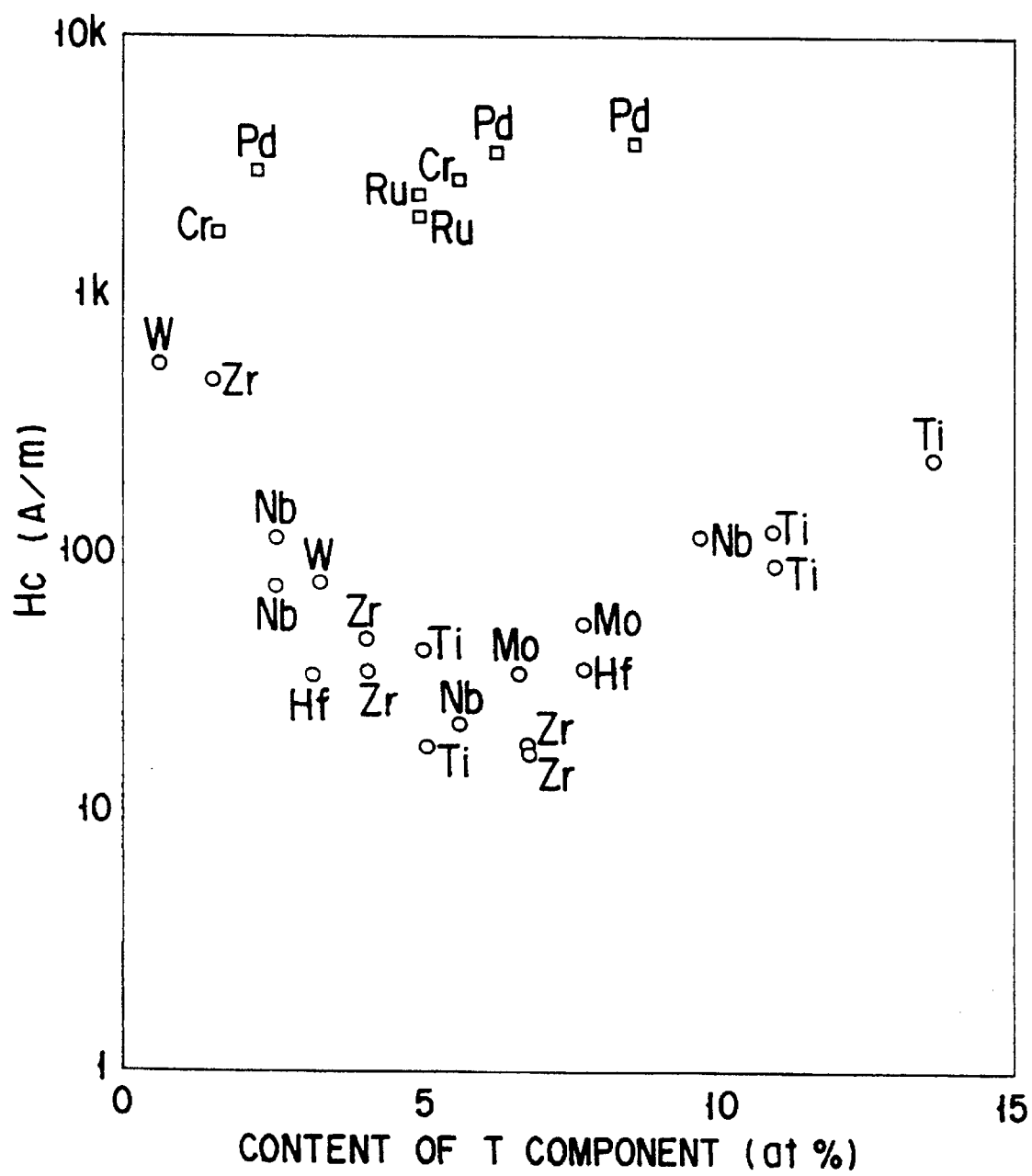
F I G. 9

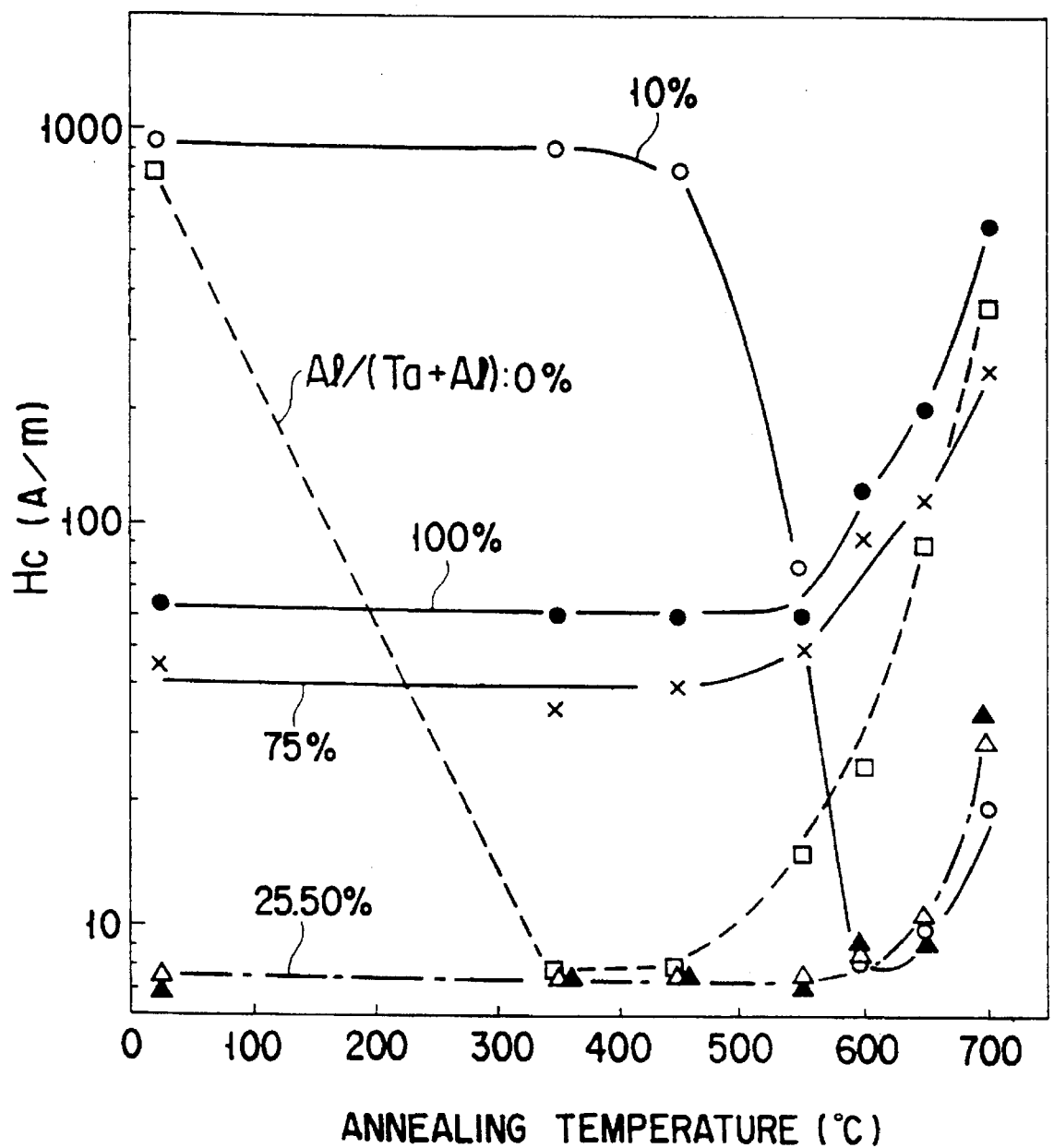
F I G. 10

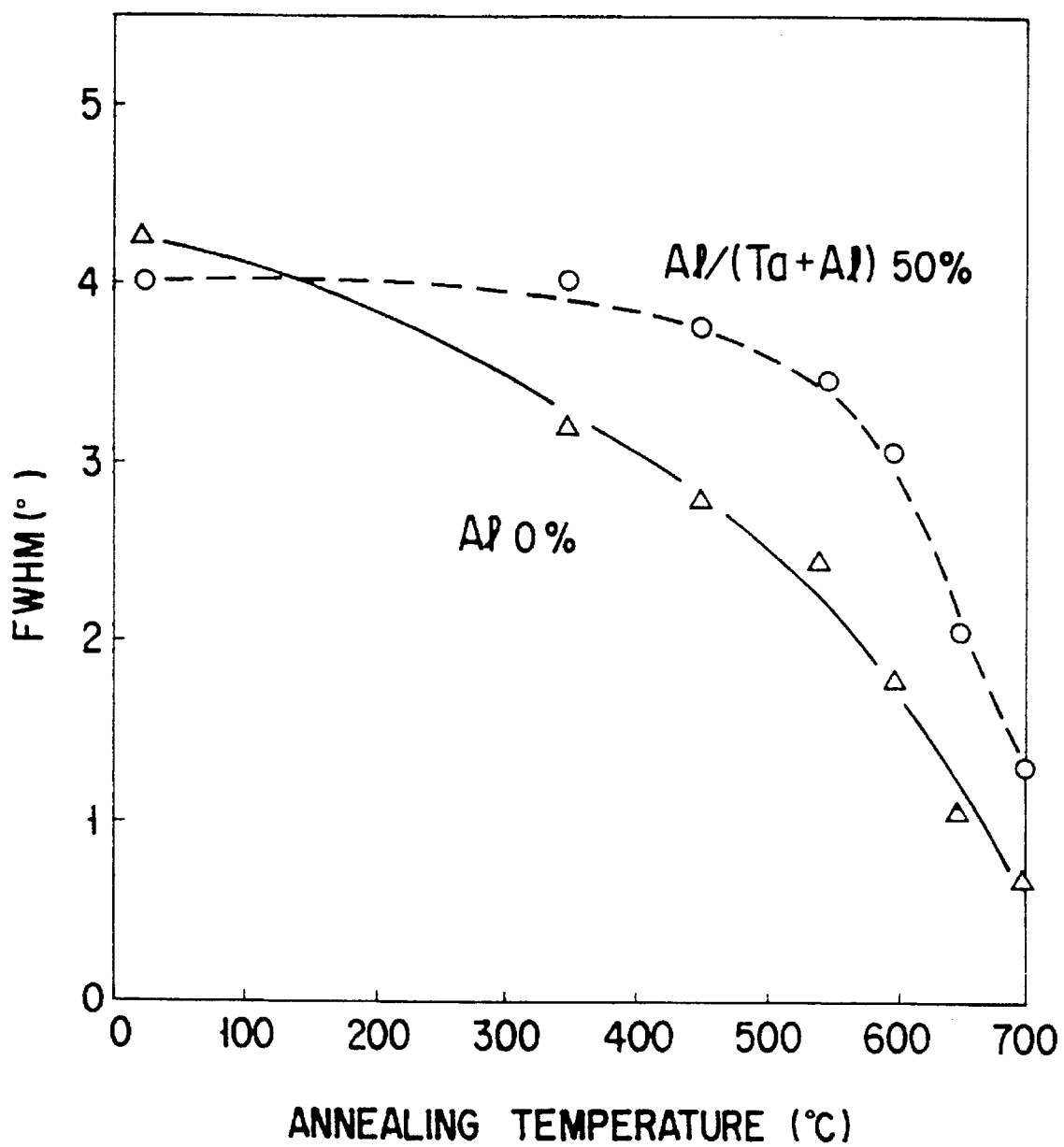
F I G. 13

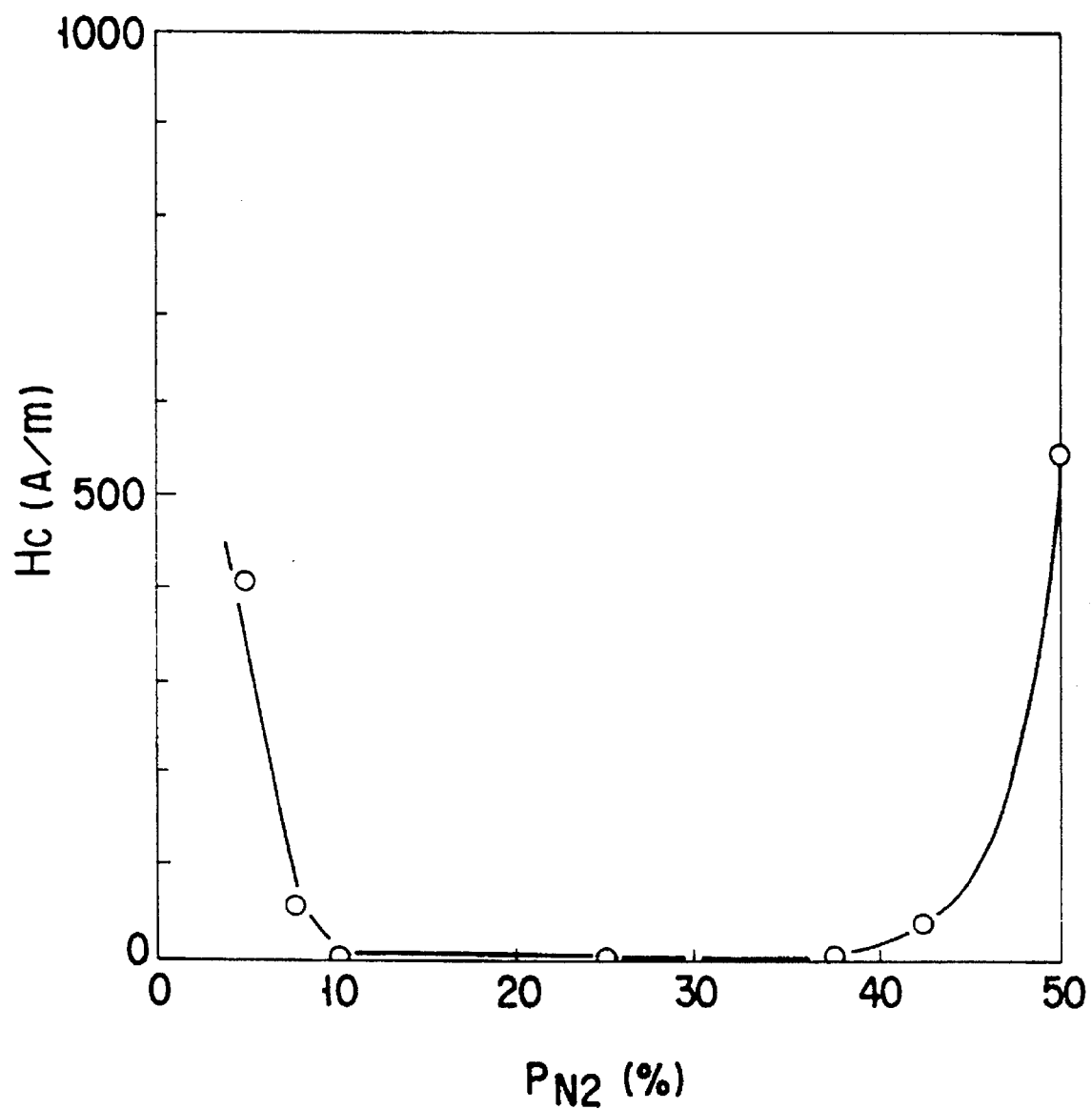
F I G. 15

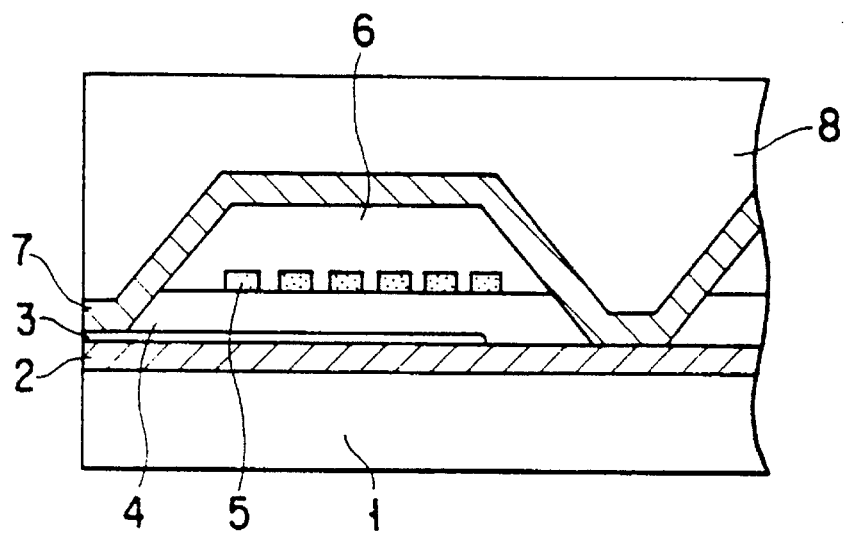
F I G. 18
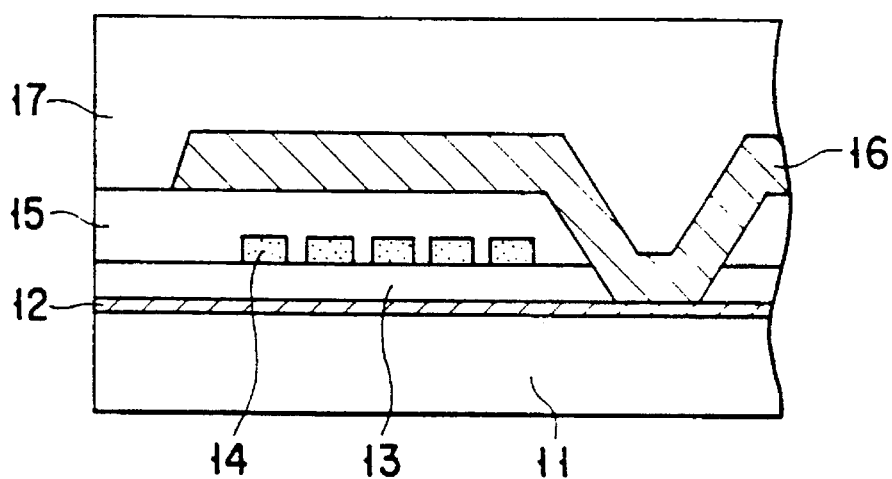
F I G. 19

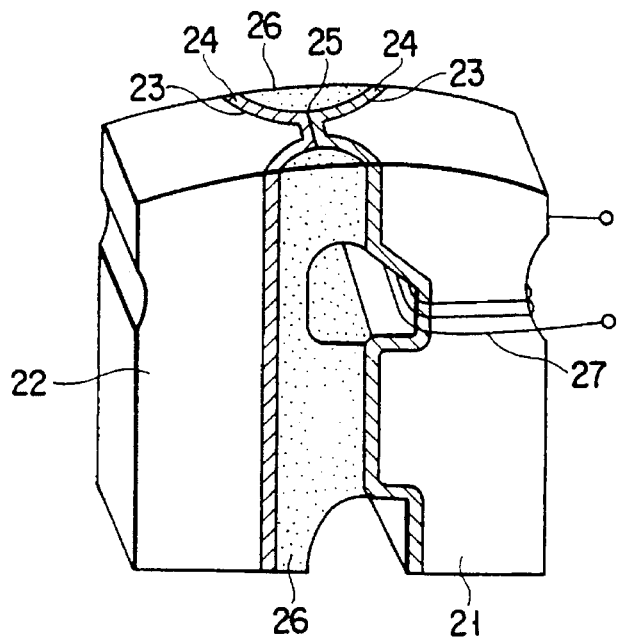
F I G. 20
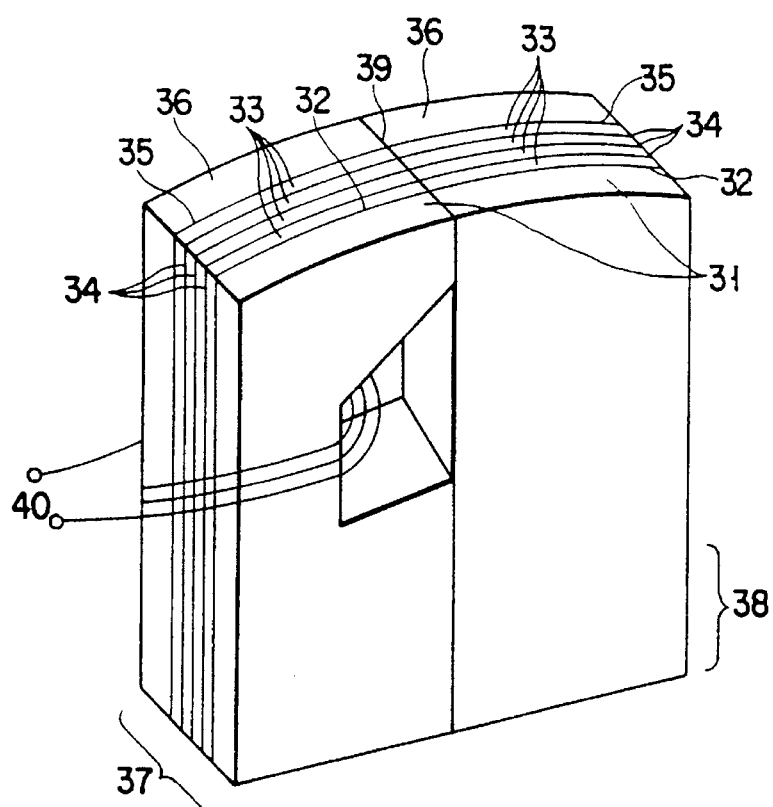
F I G. 21

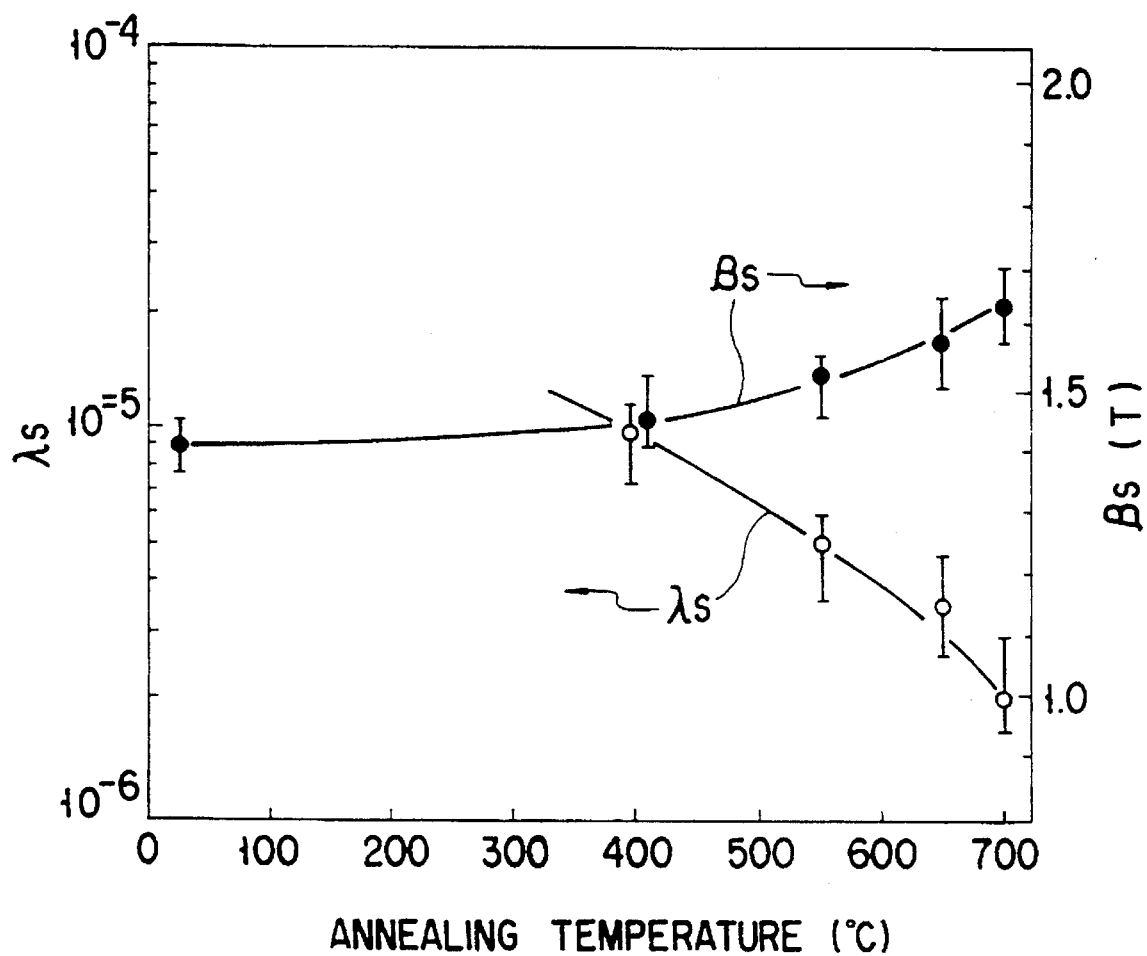
F I G. 23

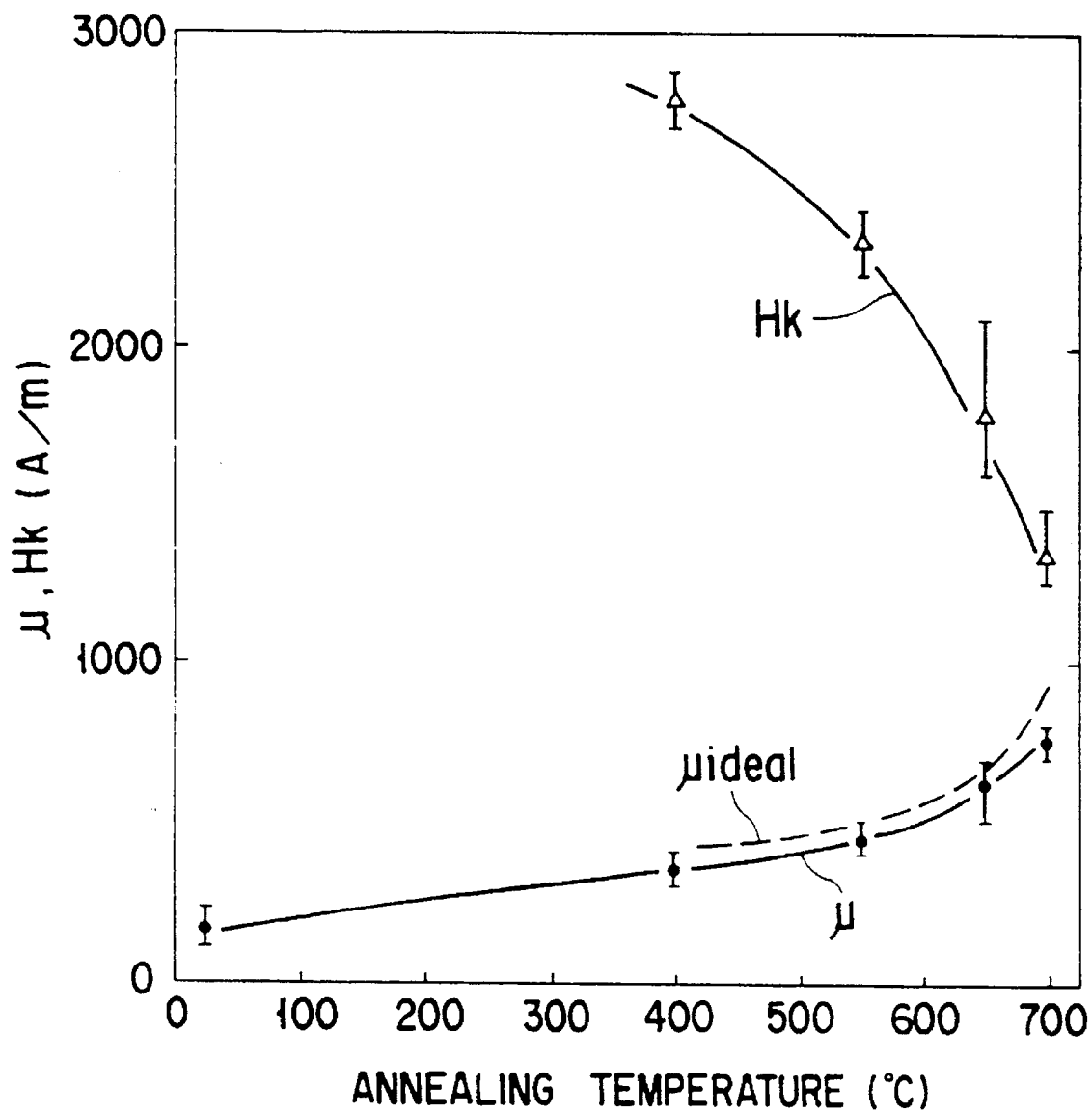
F I G. 24

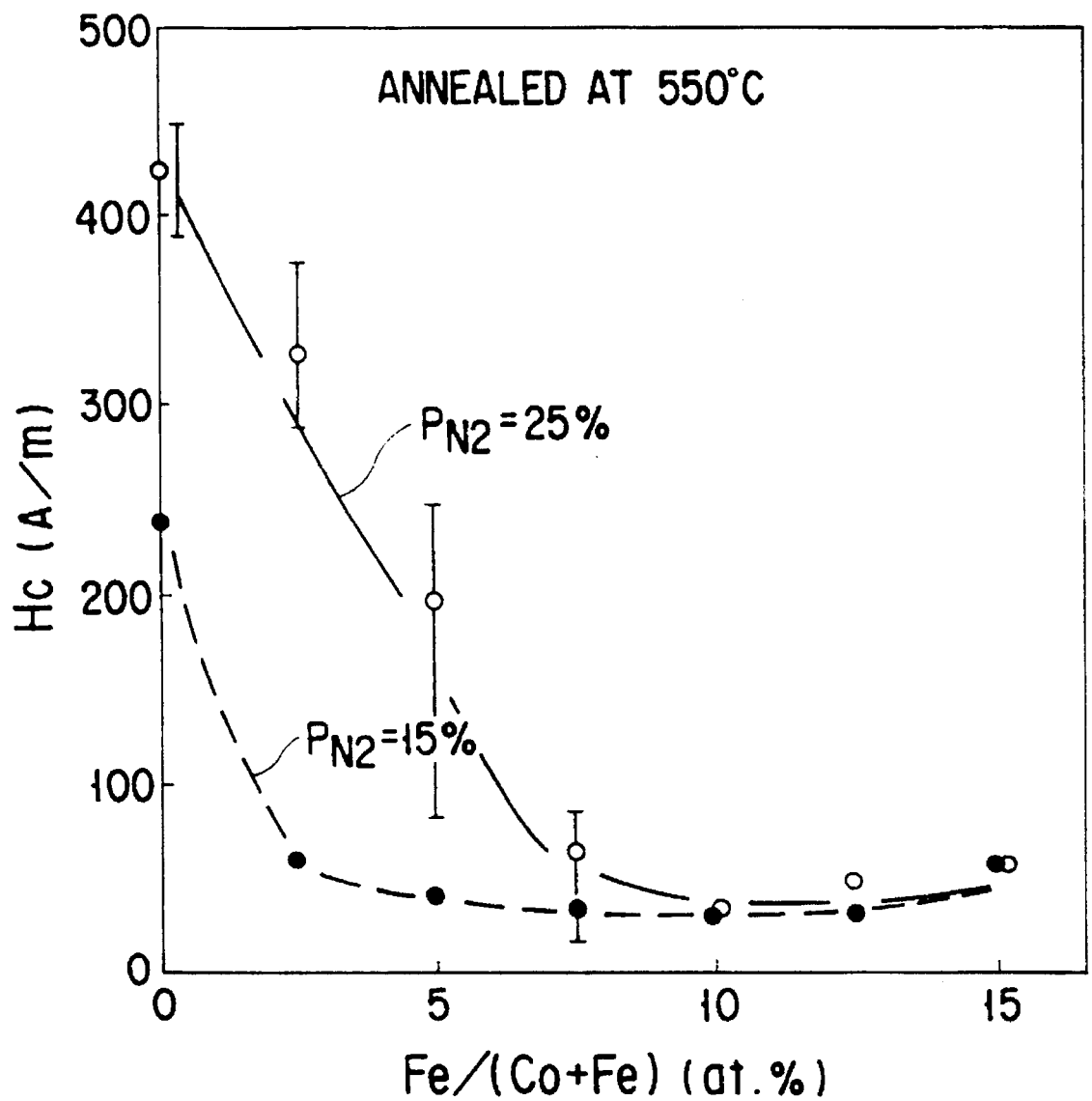
F I G. 28

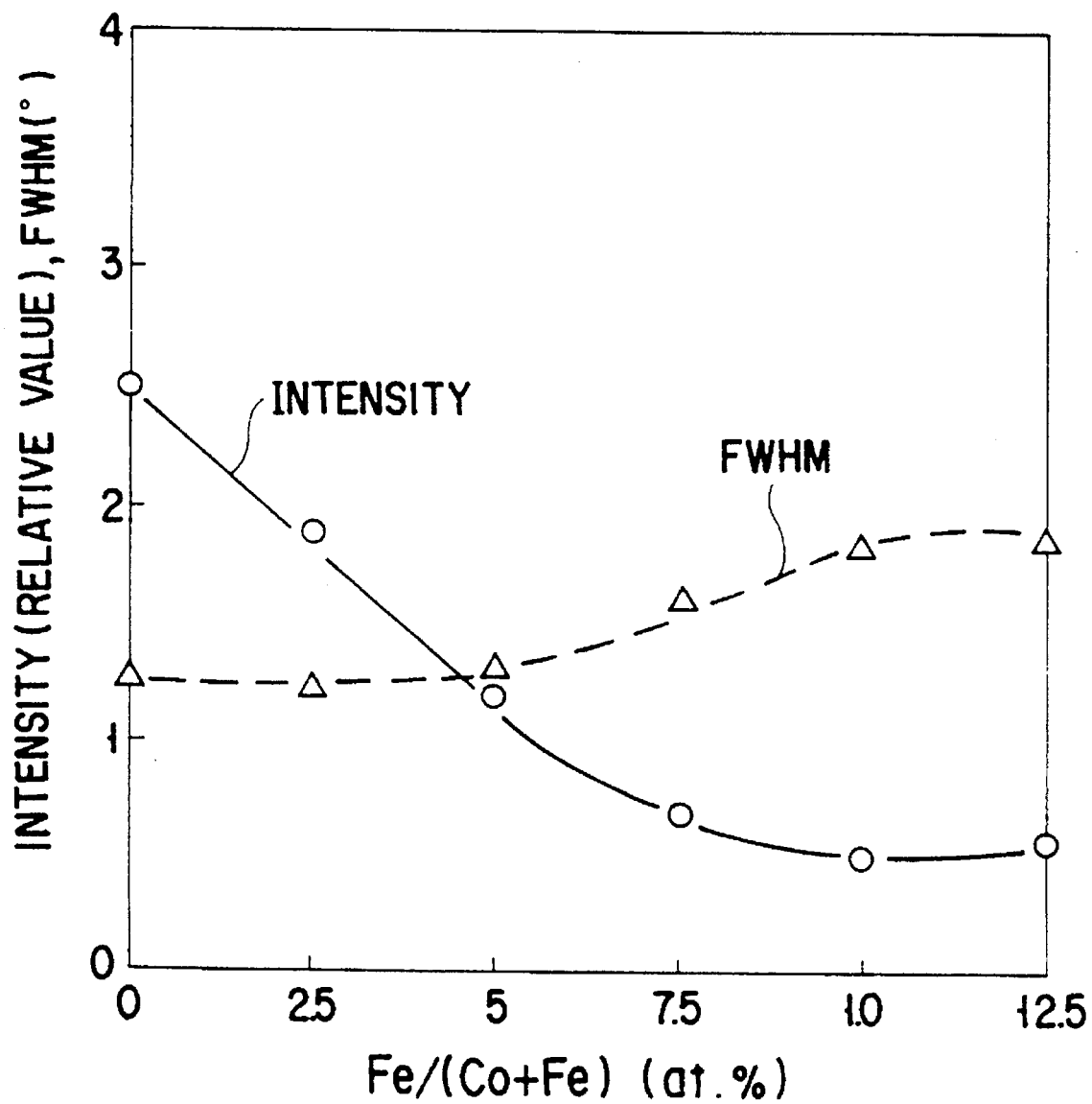
F I G. 35

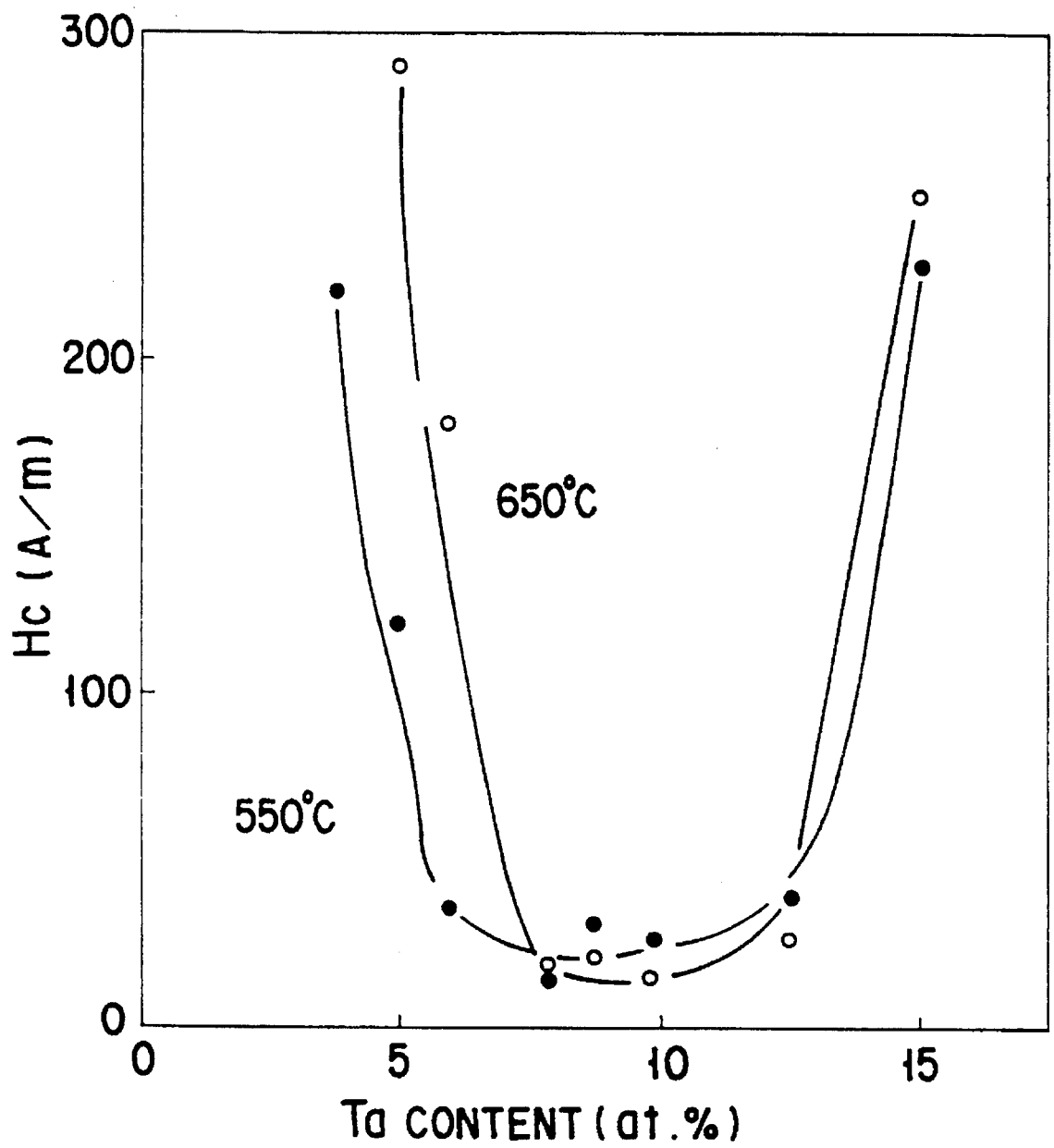
F I G. 36

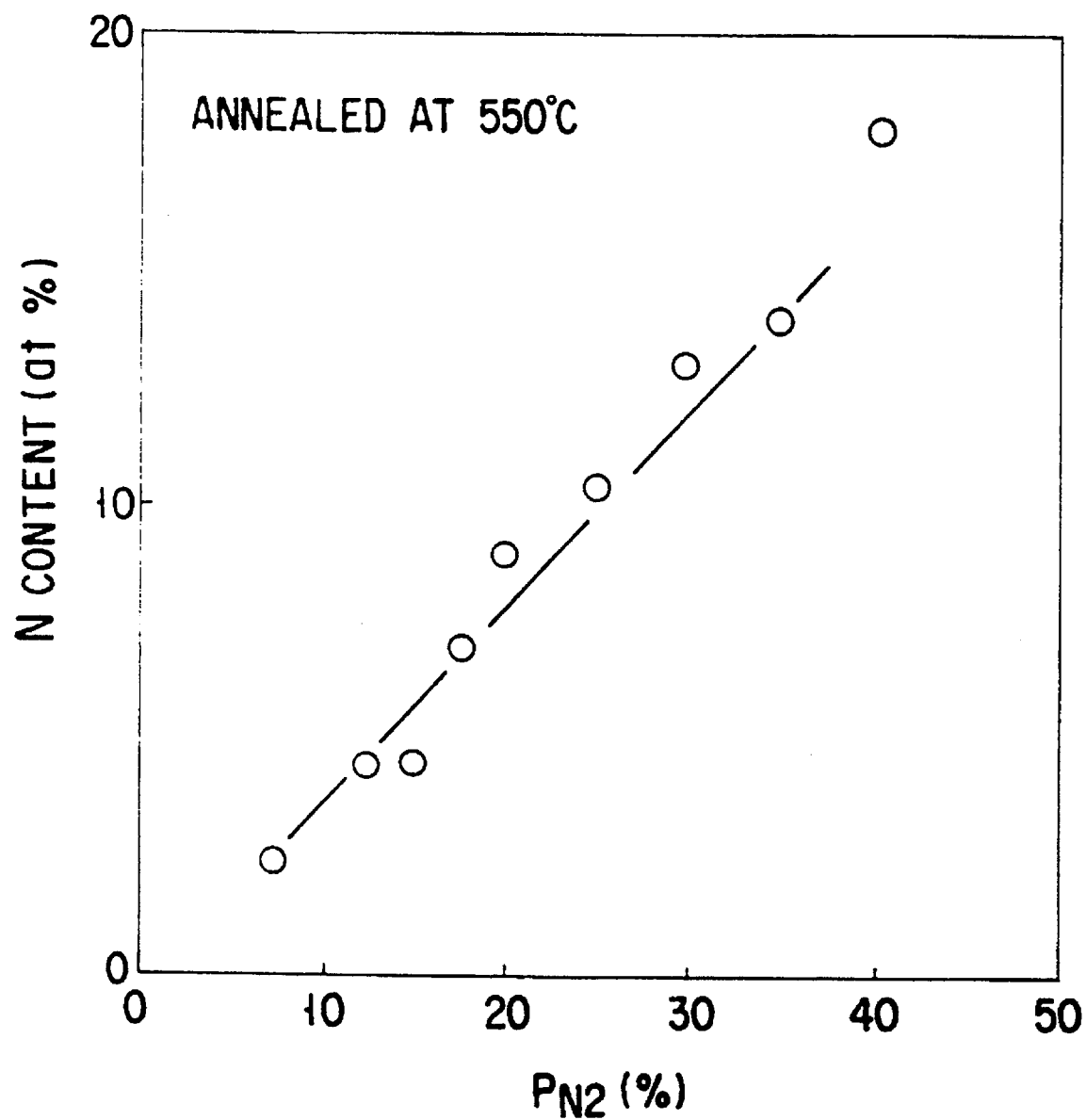
F I G. 38

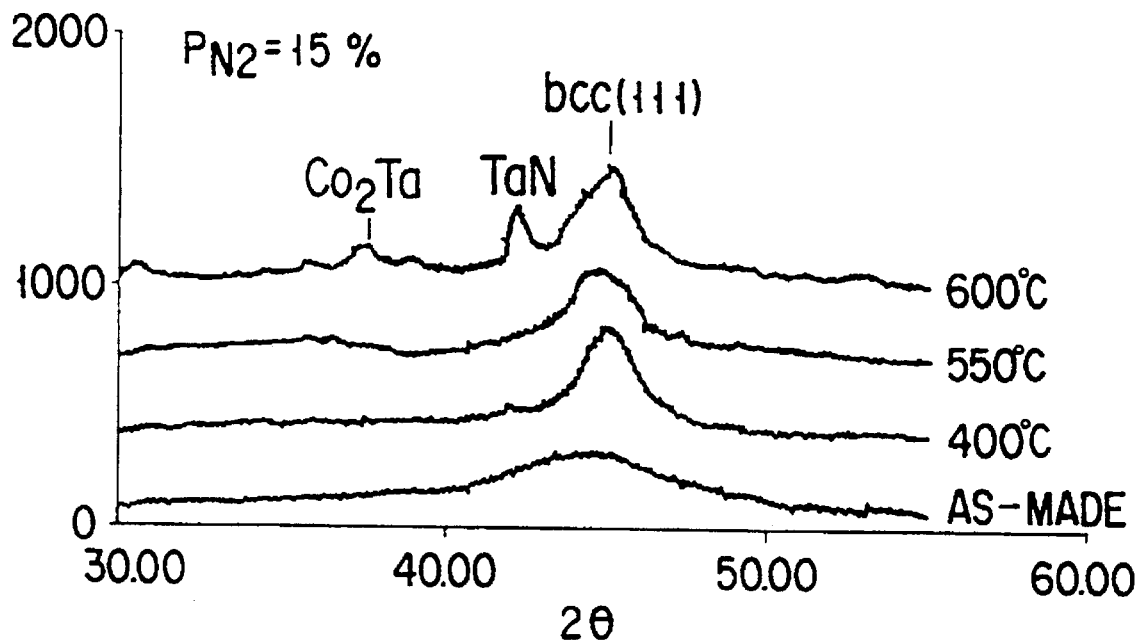
F I G. 40A
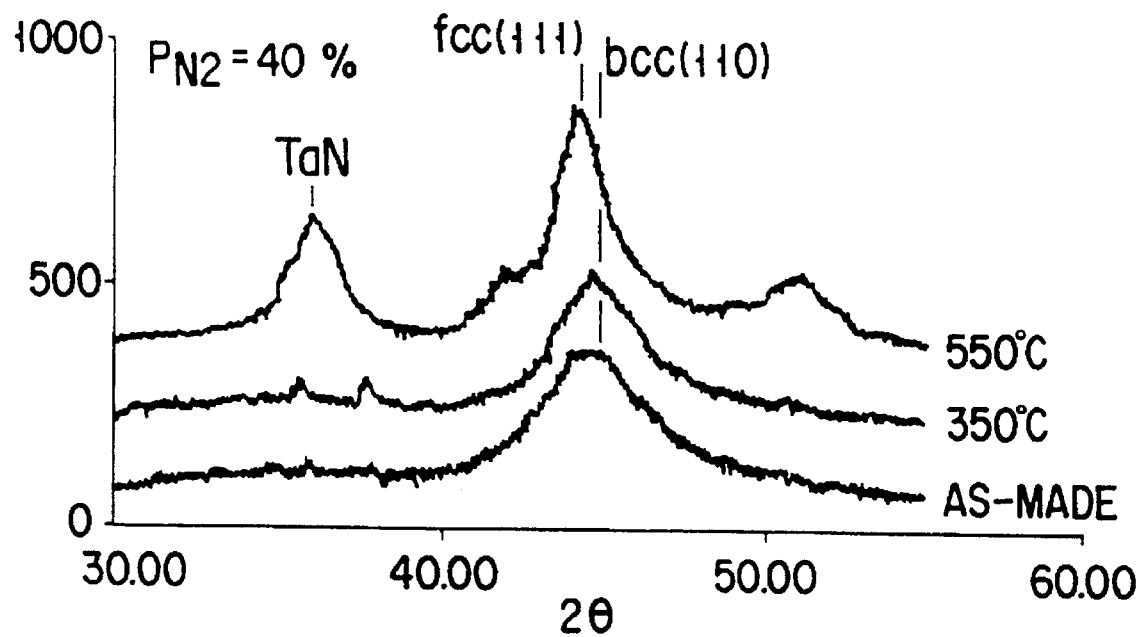
F I G. 40B

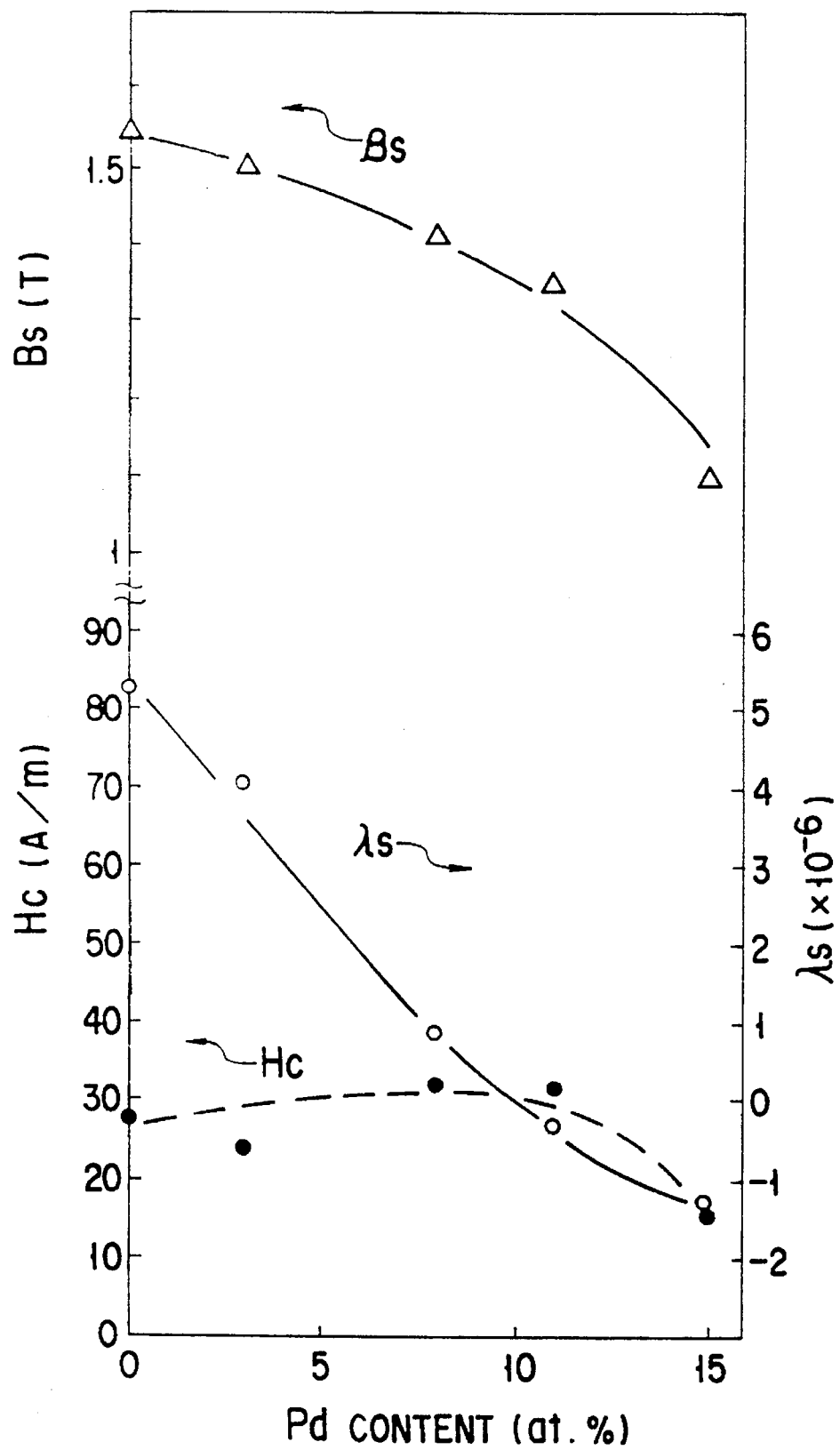
F I G. 41

FERROMAGNETIC FILM

This is a continuation, of application Ser. No. 08/188, 747, filed on Jan. 31, 1994, now U.S. Pat. No. 5,484,491, which is a continuation of application Ser. No. 07/954,042, filed on Sep. 30, 1992, now abandoned.

BACKGROUND OF THE INVENTION

1. Field of the Invention

The present invention relates to a ferromagnetic film suitable for a magnetic head and the like.

2. Description of the Related Art

Generally, a magnetic film for a magnetic head is required to have high saturation magnetic flux density (high Bs) and soft magnetic characteristics, e.g., low coercive force (low Hc), so that it can have a sufficient recording capability for a recording medium having high coercive force (high Hc).

Although Fe-, Co- and FeCo-based alloys exhibit high Bs, they have undesirably high Hc because of a large magnetocrystalline anisotropy. Therefore, it is difficult to obtain excellent soft magnetic characteristics suitable for a magnetic head and the like. Although FeAlSi and NiFe alloy films obtained by adding additives to above alloys, thereby setting the magnetocrystalline anisotropy close to zero, exhibit low Hc, their saturation magnetic flux density Bs is as low as 1.1 tesla (T) at maximum. Although many Fe- and Co-based alloys exhibit low Hc when they are made amorphous, the saturation magnetic flux density Bs of those that can be put into practical use considering their heat resistance is as low as 1.0 T at maximum.

Nevertheless, even a film having a large magnetocrystalline anisotropy can be set to exhibit low Hc theoretically by controlling its crystal orientation. More specifically, an fcc (111) oriented magnetic film exhibits low Hc since the influence of a magnetocrystalline anisotropy constant $K_1$ can be neglected within the film plane. For example, a bcc-phase Fe solid solution exhibits the (111) orientation and low Hc by selecting an appropriate underlying substrate, e.g., FeSi/ZnSn (Hosono et al., J. Appl. Phys., 67, 6990 (1990)). The Fe-based alloy, however, usually exhibits the (100) or (110) orientation because the bcc phase is stable. The (111) orientated film is hard to grow stably other than on a specific substrate such as ZnSe because it has a large surface energy.

In the case of a Co-based alloy with a composition near $Co_{90}Fe_{10}$ having Bs of about 1.9 T, it is confirmed from the phase diagram that the fcc phase stably exists in the alloy. In the fcc phase, the (111) plane is a stably growing plane owing to low surface energy. In fact, however, it is difficult to obtain the high (111) orientation even in such an alloy film.

A magnetic film obtained by adding a transition metal, e.g., zr or Ta, and nitrogen to Fe or Co is promising for a magnetic recording head in the future because it has high Bs and its soft magnetism is not degraded by heat. In addition, when considering the practical applicability in a high-humidity atmosphere containing chlorine, a Co-based magnetic film may be suitable since an Fe-based magnetic film does not have a sufficiently high corrosion resistance.

As Co-based nitrogen-added films, a nitrogen-content modulated film having a multilayered structure (IEEE Trans. Magn., 23, 3707 (1987)), a CoNbZrN film (J. Appl. Phys., 68, 4760 (1990)), a CoFeAlN film which has been studied by the present inventors (Preprint of meeting of the 14th Japan Applied Magnetics Society, 292 (1990)), and the like are known. Each of these magnetic films is known to have low Hc of 80 A/m or less equivalent to that of a conventional magnetic film and exhibits excellent soft magnetism.

However, these magnetic films have the following drawbacks. The nitrogen-content modulated film maintains its soft magnetism up to about 700° C. and exhibits a considerably high heat resistance. However, its manufacturing process is complicated since it has a multilayered structure. In contrast to this, the CoNbZrN and CoFeAl films are easy to manufacture since they have a single-layered structure. However, when these magnetic films are annealed at 400° C. or more, crystal growth gradually proceeds in them to cause an increase in Hc and a decrease in resistivity. Especially, when these magnetic films are applied to a laminated head that employs a high-temperature manufacturing process at 600° C. or more, an increase in Hc accompanying the crystal growth poses a serious problem. In addition, the decrease in resistivity causes an degradation of the RF characteristics due to an increase in eddy currents. A CoNbZrN film manufactured by ion beam sputtering exhibits excellent characteristics. However, a CoNbZrN manufactured by conventional RF magnetron sputtering does not always exhibit excellent characteristics since a perpendicular magnetic anisotropy tends to occur easily, resulting in a small manufacturing margin. Regarding the CoFeAlN film, it does not have a sufficient corrosion resistance in water.

As described above, although the CoFe-based alloys have high saturation magnetic flux density of 1.9 T or more, they have a large magnetocrystalline anisotropy and cannot realize high (111) orientation. Therefore, it is difficult to achieve sufficiently low Hc suitable for a magnetic film of a head magnetic pole.

Regarding the magnetic films obtained by adding a transition metal such as Zr or Ta and nitrogen to a ferromagnetic metal such as Co, when they are annealed at a high temperature, crystal growth gradually proceeds in them to cause an increase in Hc and a decrease in resistivity, resulting in an insufficient heat resistance. When these films are manufactured by conventional RF magnetron sputtering, a perpendicular magnetic anisotropy tends to occur easily, and therefore it is difficult to obtain excellent soft magnetism.

SUMMARY OF THE INVENTION

It is an object of the present invention to provide a ferromagnetic film suitable for a magnetic head, which has high saturation magnetic flux density Bs, excellent soft magnetism not to be degraded by high-temperature annealing, a large manufacturing margin, and high corrosion resistance.

A ferromagnetic film according to an aspect of the present invention consists of an alloy represented by a formula $Co_xFe_yT_z$, wherein T is an element selected from the group consisting of Al, Ta, Ti Zr, Nb, Hf, Mo, and W, and $\underline{x}$, $\underline{y}$, and $\underline{z}$ represent at % and satisfy $73<x<94$, $5<y\leq15$, $1<z<12$, and $x+y+z=100$.

A ferromagnetic film according to another aspect of the present invention consists of an alloy represented by a formula $(M_aT_b)_xN_y$, wherein M consists of Co or Co and Fe, T consists of an element selected from the group of transition metals consisting of Ta, Nb, Zr, Hf, Ti, Cr, Mo, and W, and Al, N is nitrogen, $\underline{a}$, $\underline{b}$, $\underline{x}$, and $\underline{y}$ represent at % and satisfy $85<a<96$, $4<b<15$, $a+b=100$, $80<x<98$, $2<y<20$, and $x+y=100$, the Fe content of M satisfies $0\leq Fe\leq15$ at %, and the Al content of T satisfies $4<Al\leq50$ at %.

A ferromagnetic film according to still another aspect of the present invention consists of an alloy represented by a formula $(M_aT_b)_xN_y$, wherein M consists of Co and Fe, T is an element selected from the group of transition metals consisting of Ta and Nb, N is nitrogen, a, b, x, and y represent at % and satisfy $85<a<95$, $5<b<15$, $a+b=100$, $82<x<97.5$, $2.5<y<18$, $x+y=100$, and the Fe content of M satisfies $2.5 \leq Fe \leq 12.5$ at %.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a graph showing the relationship between the diffraction intensity of the main peak and the coercive force Hc with respect to CoFeT-based magnetic films containing various additive components;

FIGS. 2A and 2B are graphs showing the x-ray diffraction curves near $2\theta=44°$ of a CoFePd film and a CoFeTa film, respectively;

FIG. 5 is a graph showing the relationship among the Ta content, Hc and Bs with respect to CoFeTa films;

FIG. 6 is a graph showing the relationship between the Fe content and Hc with respect to CoFeTa films having the same Ta content of about 8 at % and different Fe contents;

FIG. 9 is a graph showing the relationship between the T component content and Hc with respect to CoFeT-based magnetic films;

FIG. 10 is a graph showing the relationship between the annealing temperature and Hc with respect to the CoFeTaAlN-based magnetic films by using the substituted Al ratio as a parameter;

FIG. 13 is a graph showing the relationship between the annealing temperature and the full width at half maximum (FWHM) of the main peak with respect to the CoFeTaAlN-based films having different substituted Al ratios;

FIG. 15 is a graph showing the relationship between the nitrogen concentration in the sputtering gas and Hc with respect to CoFeTaAlN-based films annealed at 600° C.;

FIG. 18 is a sectional view showing a thin film magnetic head of a longitudinal recording type;

FIG. 19 is a sectional view showing a thin film magnetic head of a perpendicular recording type;

FIG. 20 is a perspective view showing a metal-in-gap head;

FIG. 21 is a perspective view showing a laminated head;

FIG. 23 is a graph showing the relationship among the annealing temperature, Bs and λs with respect to a CoFeTaN film;

FIG. 24 is a graph showing the relationship among the pre-annealing temperature, Hk and μ with respect to a CoFeTaN film;

FIG. 28 is a graph showing the relationship between the Fe content of the M component (Co+Fe) and Hc with respect to CoFeTaN-based films annealed at 550° C.;

FIG. 35 is a graph showing the relationship among the Fe content of the M component, the diffraction intensity of the main peak, and FWHM with respect to CoFeTaN-based films formed in an atmosphere having a nitrogen concentration of 25% and annealed at 650° C.;

FIG. 36 is a graph showing the relationship between the Ta content and the Hc with respect to CoFeTaN-based films;

FIG. 38 is a graph showing the relationship between the nitrogen concentration $P_{N2}$ in the sputtering gas and the nitrogen content with respect to CoFeTaN-based films;

FIGS. 40A and 40B are graphs showing the annealing temperature dependency of x-ray diffraction curve with respect to the films formed at $P_{N2}$ =15% and 40%, respectively; and FIG. 41 is a graph showing the relationship among the Pd content, the saturation magnetic flux density Bs, the Hc, and the saturation magnetostriction λs of each CoFeTaPd-based magnetic film.

DETAILED DESCRIPTION OF THE PREFERRED EMBODIMENTS

Figure 3A:
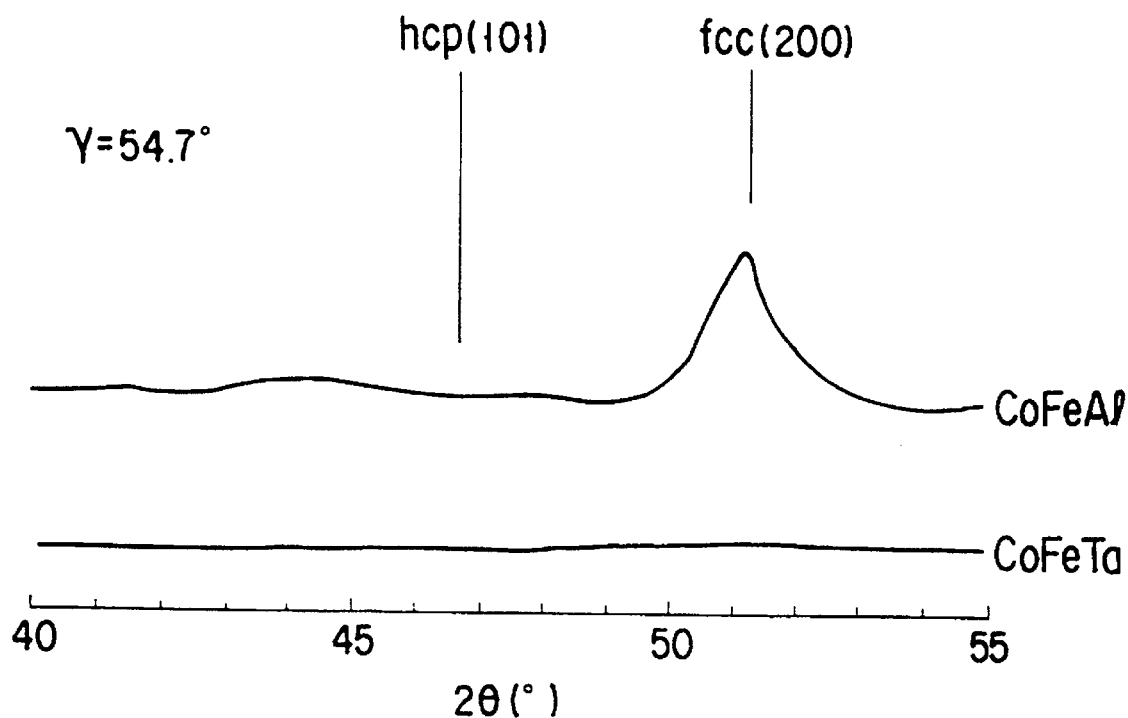
FIGS. 3A and 3B are graphs showing the x-ray diffraction curves with respect to CoFeT-based films on diffraction planes inclined at angles of 54.7° and 61.6° to the film surface, respectively.

A CoFeT-based magnetic film according to the present invention can be formed by various sputtering methods (DC, RF, and ion beam sputtering) using an Ar gas or vacuum deposition. The soft magnetic characteristics can be improved by annealing the film after the film is formed. Note that the film fabricated by sputtering inevitably contains a small amount of oxygen and Ar.

The magnetic film can be preferentially oriented to the fcc-phase (111) plane or hcp-phase (001) plane by adding at least one element selected from the group consisting of Al, Ta, Ti, Zr, Nb, Hf, Mo, and W as the T component. Thus, low coercive force Hc can be realized without causing a large magnetocrystalline anisotropy in the film surface.

The T component content of the CoFeT-based magnetic film is set to 1 to 12 at % for the following reason. If it is less than 1%, high orientation to fcc (111) or hcp (001) cannot be realized, thus low Hc cannot be achieved. If it exceeds 12 at %, an intermetallic compound with Co is formed especially when the film is annealed, and low Hc cannot be achieved. The appropriate composition range providing low Hc slightly changes depending on the film deposition method, the film deposition condition, and the annealing condition.

The CoFeT-based ferromagnetic film can achieve high saturation magnetic flux density Bs of 1.5 to 1.9 T and low Hc of 150 A/m or less by defining the T component content within the range described above. Accordingly, a magnetic head very advantageous for high-density recording can be stably manufactured by using this ferromagnetic film.

A CoFeAlTN-based magnetic film according to the present invention can be formed by conventional RF magnetron sputtering in a gas mixture atmosphere of argon and nitrogen. A special method, e.g., ion beam sputtering, is not necessarily required. Soft magnetic characteristics can be improved by annealing the formed film as required. Note that the film formed by sputtering inevitably contains a small amount of oxygen and argon.

The CoFeAlTN-based ferromagnetic film obtained by adding a transition metal and Al in a Co-based nitride film can achieve the following effects: (1) Excellent magnetic characteristics of about 30 A/m or less can be maintained even if high-temperature annealing at 600° C. or more is performed. (2) Since the resistivity is raised, degradation in RF characteristics due to the eddy currents can be prevented. (3) The manufacturing margin is large even if the film is formed by conventional RF magnetron sputtering. In the CoFeAlTN-based ferromagnetic film, the contents of the respective components are defined as described above for the following reason.

If b indicating T component content is less than 4 at % and y indicating N content is less than 2 at %, low Hc cannot be obtained when the film is annealed. If b indicating the T component content exceeds 15 at % and y indicating the N content exceeds 20 at %, excessive nitrides are formed by annealing to degrade the soft magnetic characteristics. If b indicating the T component content exceeds 4 at % and y indicating the N content exceeds 2 at %, a fine crystal structure having high heat resistance is obtained to improve the heat resistance of the soft magnetic characteristics.

If the Fe content of the M component exceeds 15 at %, mixing of the bcc phase in the film becomes remarkable even after annealing, and thus the magnetostriction increases to +1×10$^{-5}$ or more. If the Fe content of the M component is 0 to 15 at %, the fcc phase becomes dominant after annealing, and thus low magnetostriction of +3×10$^{-6}$ or less can be realized. The Fe content of the M component is preferably 10 at % or less.

If the Al content of the T component (transition metal and Al) is 4 at % or less, no effect is obtained by adding Al, and crystal grains grow when the film is annealed at high-temperature. Therefore, it is difficult to lower Hc. If the Al content of the T component exceeds 50 at %, adverse influences are caused such that the corrosion resistance is degraded, the resistivity is lowered, and the soft magnetic characteristics are degraded by high-temperature annealing. When the Al content of the T component is defined within an appropriate range of 4 to 50 at %, a magnetic film can be obtained which has a higher heat resistance, a higher resistivity, and a larger manufacturing margin than those of the conventional Co-based magnetic film. The Al content of the T component is preferably 25 to 50 at % because even an as-made film exhibits low Hc if it satisfies this condition.

A Co-based nitride film not containing Al but containing Ta or Nb according to the present invention can also exhibit soft magnetic characteristics not to be degraded by high-temperature annealing, if its composition is defined appropriately. The contents of the respective components of the CoFeTaN- or CoFeNbN-based ferromagnetic film are defined as described above for the following reason.

When a magnetic film containing only Co as the M component is formed by conventional sputtering, a perpendicular magnetic anisotropy tends to occur easily in the film, and also non-uniform crystal growth is caused easily. In contrast to this, if the Fe content of the M component (Co+Fe) is defined to 2.5 to 12.5 at %, the perpendicular magnetic anisotropy and non-uniform crystal growth can be diminished. As a result, even if the film is annealed at 550° C., low Hc of 80 A/m or less and low magnetostriction of +3×10$^{-6}$ can be obtained. Therefore, such a magnetic film can be applied to a metal-in-gap head. Furthermore, if the Fe content of the M component (Co+Fe) is defined to 5 to 12.5 at %, the bcc phase is precipitated during annealing, and then phase transformation from the bcc phase to the fcc phase and a nitride takes place. Therefore, crystal growth is suppressed even if annealing is performed at 650° C. to provide excellent soft magnetic characteristics. Such a magnetic film can be applied to a laminated head as well. If the Fe content exceeds 12.5 at %, the fcc phase is not easily formed and the bcc phase is stabilized. Such a magnetic film is not preferable since it exhibits high magnetostriction of $+1\times10^{-5}$ or more.

If $\underline{b}$ indicating the T component content is 5 at % or less, the as-made film made of crystallite close to amorphous will not be formed. Even if this film is annealed, low Hc of 80 A/m or less cannot be obtained. If b indicating the T component content is 15 at % or more, also excellent soft magnetic characteristics cannot be obtained. In order to solve these problems, it may be considered to increase the nitrogen content of the film. If the nitrogen content is increased, however, new problems are posed: (1) Excessive nitrides are formed by annealing, and low Hc cannot be obtained. (2) A perpendicular magnetic anisotropy tends to occur. (3) The film tends to be peeled easily. On the other hand, if the T component content is defined to 7.2 at % $\leq b<15$ at %, low Hc can be obtained even if the film is annealed at 650° C. Therefore, such a film can be applied to a laminated head.

If the N content is 2.5 at % or less, crystal growth becomes remarkable when the film is annealed at 550° C., and low Hc cannot be obtained. If the N content is 18 at % or more, the similar problems as those described above arise. The value $\underline{y}$ indicating N content preferably exceeds 6 at % in order to obtain low Hc even when the film is annealed at 650° C.

When pd or Re is added to a CoFeTaN- or CoFeNbN-based film within the range of 15 at % or less, the magnetostriction can be adjusted to almost zero. In addition, such a magnetic film satisfies low Hc and high Bs simultaneously. Furthermore, the corrosion resistance can be improved by adding Pd or Re.

EXAMPLES

CoFeT-based magnetic films will be described in Examples 1 to 3 below.

Example 1

Crystallized glass or single crystalline Si subjected to organic alkali cleaning was used as a substrate. A composite target consisting of a Co-11.5 at % Fe-4 at % Al alloy or a Co-10 at % Fe alloy and a chip of an additive component T placed thereon was used as a target. A magnetic film having a thickness of 1 μm was formed on the substrate in an Ar gas atmosphere by dipole magnetron sputtering. The T component content of the magnetic film was controlled to about 5 at %. Sputtering was performed by the following conditions:

| | |
|---|---|
| RF power density: | 3.2 W/cm² |
| Total sputtering gas pressure: | 0.27 to 0.1 Pa |
| Interelectrode distance: | 90 mm |
| Preliminary evacuation: | $1.3 \times 10^{-4}$ Pa |

The physical properties of the obtained magnetic film were measured in the following manner. Saturation magnetic flux density Bs and coercive force Hc were measured by applying a magnetic field of 400 kA/m at maximum in the direction of the hard axis of magnetization of the magnetic film. The crystal structure of the film was examined by θ–2θ scanning x-ray diffraction using CuKa rays. The contents of Co, Fe, and the T component of the film were examined by x-ray fluorescence analysis (XRF).

Magnetic films containing various additive elements T were formed in accordance with the above conditions. FIG. 1 shows the relationship between the diffraction intensity of the main peak near 2θ=44° (referred to as "Imain" hereinafter) and Hc of each of these magnetic films. This peak is supposed to be due to reflection from fcc (111) or hcp (002). The data of FIG. 1 were measured with respect to as-made (non-annealed) magnetic films.

As is seen from FIG. 1, as Imain increases, Hc monotonously decreases. When the additive element of Ta, Ti, Al, Nb, Hf, W, or Mo was used, Imain increased to about $10^5$ counts per second (cps), and low Hc was obtained. When the additive element of Si, Pd, or Ru was used, however, Imain was less than $10^4$ cps, and high Hc exceeding $10^3$ A/m was obtained.

The crystal structures of typical samples, i.e., a sample with Imain<$10^4$ cps and Hc>$10^3$ A/m and a sample with Imain>$10^5$ cps and Hc$\leq$200 A/m will be discussed. FIGS. 2A and 2B show the x-ray diffraction curves of a CoFePd film (composition: $Co_{BAL}Fe_9Pd_5$, Hc=6 kA/m) and a CoFeTa film (composition: $Co_{BAL}Fe_9Ta_4$), respectively. In the CoFePd film shown in FIG. 2A, a "shoulder" was observed near 2θ=41°. This "shoulder" corresponds to the peak of hcp (100). The "shoulder" near 2θ=41° was observed in the x-ray diffraction curve of any of many other films showing high Hc. On the other hand, in the CoFeTa film shown in FIG. 2B, the "shoulder" near 2θ=41° did not appear. When the locking curve of the major peak of the film with Imain >$10^5$ cps was measured, its full width at half maximum was 11° or less, which represents high orientation. It is obvious from these results that low Hc can be obtained when only an extremely intense major peak is observed with no other peak near that, i.e., when the film exhibits to be highly fcc (111) or hcp (002) orientated.

The above x-ray diffraction curves were measured the diffraction plane parallel to the film surface. Regarding a film containing Al or Ta as the additive element, x-ray diffraction curve on the diffraction plane inclined at a given angle γ to the film surface was measured. It was examined by this measurement whether the major peak was caused by reflection from an fcc phase or an hcp phase.

Figure 3B:
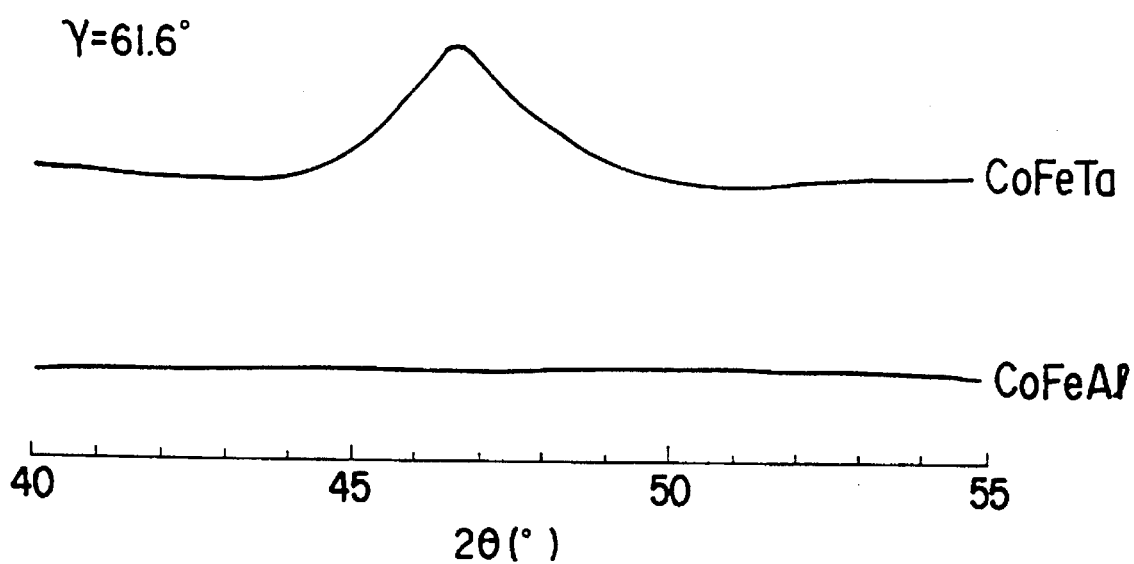

FIG. 3A shows an x-ray diffraction curve on the diffraction plane inclined at an angle γ=54.7° to the film surface. In this case, if the major peak is an fcc (111) peak, an fcc (200) peak should be observed. FIG. 3B shows an x-ray diffraction curve on the diffraction plane inclined at an angle γ=61.6° to the film surface. In this case, if the major peak is an hcp (002) peak, an hcp (101) peak should be observed. No large change was observed in the diffraction curve even when the direction of incident x-rays was changed along the film surface.

In FIG. 3A, only an fcc (200) peak was observed regarding the CoFeAl film, which signified that this film was fcc (111) oriented. No peak related to the fcc phase was observed in the CoFeTa film. Although not shown, no peak related to the fcc phase was not observed in the CoFeNb film either. In FIG. 3B, an hcp (101) peak was observed regarding the CoFeTa film, which signified that this film was hcp (001) oriented. Note that regarding a CoFeTi film, neither reflection from fcc (200) nor that from hcp (101) were observed, and whether this film made of the fcc or hcp phase could not be discriminated.

Figure 4:
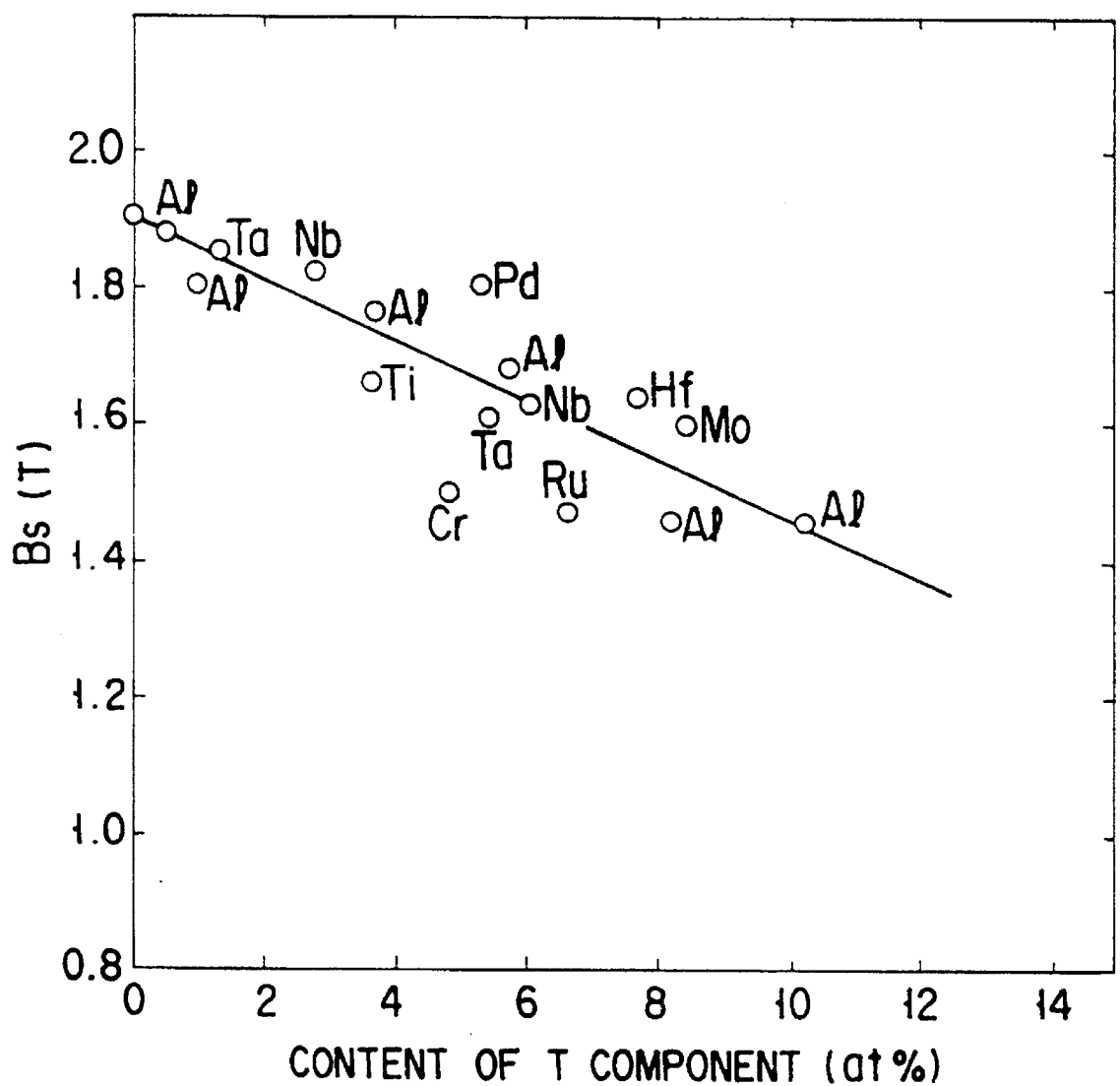
FIG. 4 is a graph showing the relationship between the T component content and the saturation magnetic flux density Bs with respect to as-made CoFeT-based films.

FIG. 4 shows the relationship between the additive element content and saturation magnetic flux density Bs with respect to the as-made CoFeT-based magnetic films. A $Co_{90}Fe_{10}$ magnetic film containing no additive element shows Bs of about 1.9 T. When the additive element of Al, Ta, Nb, Ti, Hf, or Mo was used, as the additive element content increased, Bs was monotonously decreased. However, when the additive element was Pd, a decrease in Bs was small. Inversely, when the additive element was Ru or Cr, a decrease in Bs was remarkable. When the additive element content was about 10 at %, Bs of about 1.4 T was obtained, which is higher than that of Sendust, permalloy, or a Co-based amorphous alloy.

FIG. 5 shows the relationship among the Ta content, Hc and Bs with respect to CoFeTa films. Note that data on the as-made films and annealed films are indicated in FIG. 5. The annealing conditions are as follows:

| | |
|---|---|
| Heating temperature: | 500° C. |
| Heating time: | about 1 hour |
| Heating atmosphere: | vacuum (2 to 3 × $10^{-3}$ Pa) |
| Applied magnetic field: | 20 kA/m |
| Rotational rate of sample: | 100 rpm |

A film having a Ta content of 2 at % or less exhibited high Hc exceeding 600 A/m regardless of whether it was annealed or not. A film having a Ta content of 4 at % or more exhibited an Hc of 200 A/m or less regardless of whether it was annealed or not. Especially, a film having a Ta content of 6.5 to 9 at % exhibited low Hc of 50 A/m or less. At this time, the x-ray diffraction curve exhibited the high hcp (001) orientation, as in the curves shown in FIG. 2B. In addition, these films exhibited high Bs of 1.3 T or more.

An as-made film having a Ta content of 12 at % exhibited low Hc of 30 A/m or less. When this film was annealed, however, its Hc rapidly increased. In the x-ray diffraction curve of the as-made film, a broad peak at 2θ=40° to 50° indicating to be amorphous was detected. In the x-ray diffraction curve of the annealed film, a sharp peak of a CoTa intermetallic compound was detected. In this manner, the film having the Ta content of 12 at % was degraded in Hc by annealing.

FIG. 6 shows the relationship between the Fe content and Hc with respect to CoFeTa films having the same Ta content of about 8 at % and different Fe contents. It was found from the x-ray diffraction curves measured for these films that all the films having an Fe content of 0 to 15 at % were hcp (001) oriented and no clear difference was observed between them, on the other hand, the bcc phase was mixed in the hcp phase in the films having an Fe content of 17.5 at % or more.

Figure 7:
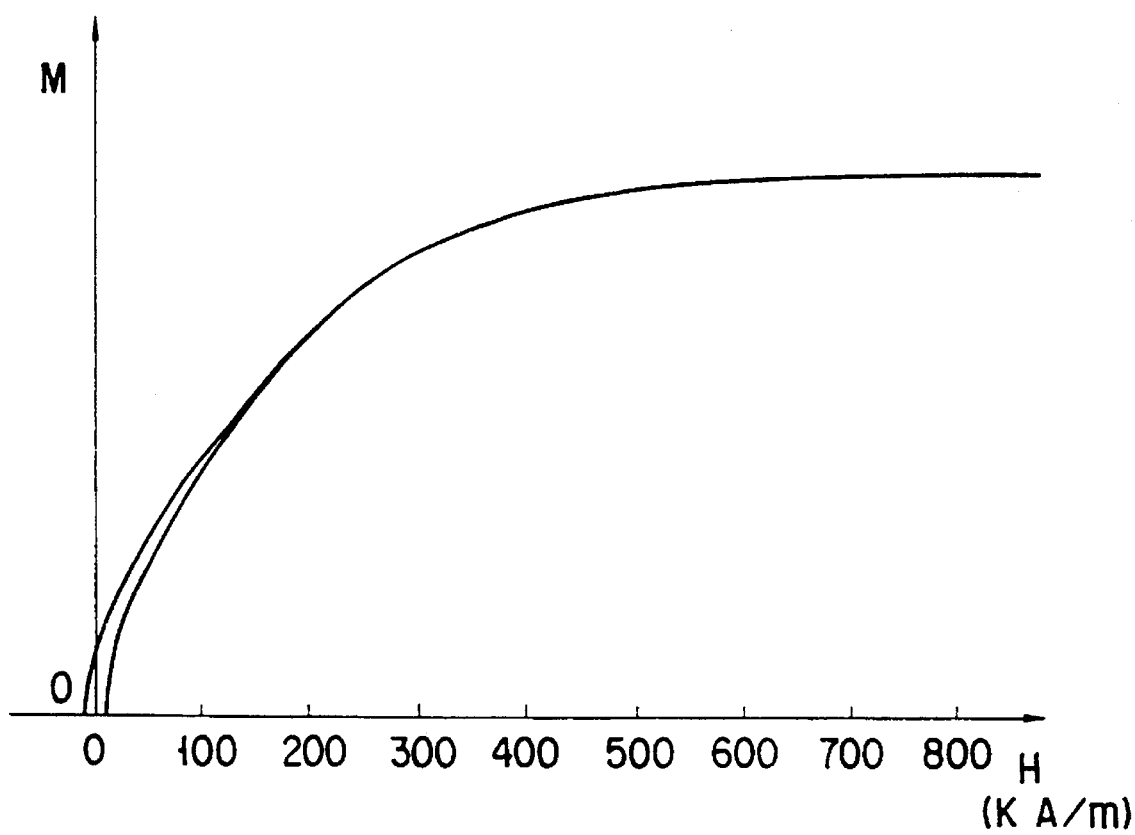
FIG. 7 is a graph showing a magnetization curve of a CoTa magnetic film.

A CoTa film not containing Fe exhibited high Hc of about 9 kA/m. As is shown in FIG. 7, this film showed a magnetization curve indicating that magnetization was hard to be saturated, specific to a film having a perpendicular magnetic anisotropy. This can be explained that because the c-axis of Co as the major component is an easy axis of magnetization (Ku is positive), and thus the perpendicular magnetic anisotropy is introduced resulting in high Hc. As the Fe content increased, Hc rapidly decreased. A film having an Fe content of 7.5 to 15 at % exhibited low Hc of 100 A/m or less. At this time, the perpendicular magnetic anisotropy disappeared. This may be because Ku decreased to about zero or a negative value by an increase in Fe content, i.e., the hcp (001) plane became the easy plane of magnetization, and thus the Hc decreased. However, in a film having the Fe content exceeding 15 at %, the bcc phase was mixed in to degrade the orientation, and Hc increased correspondingly.

Example 2

Figure 8:
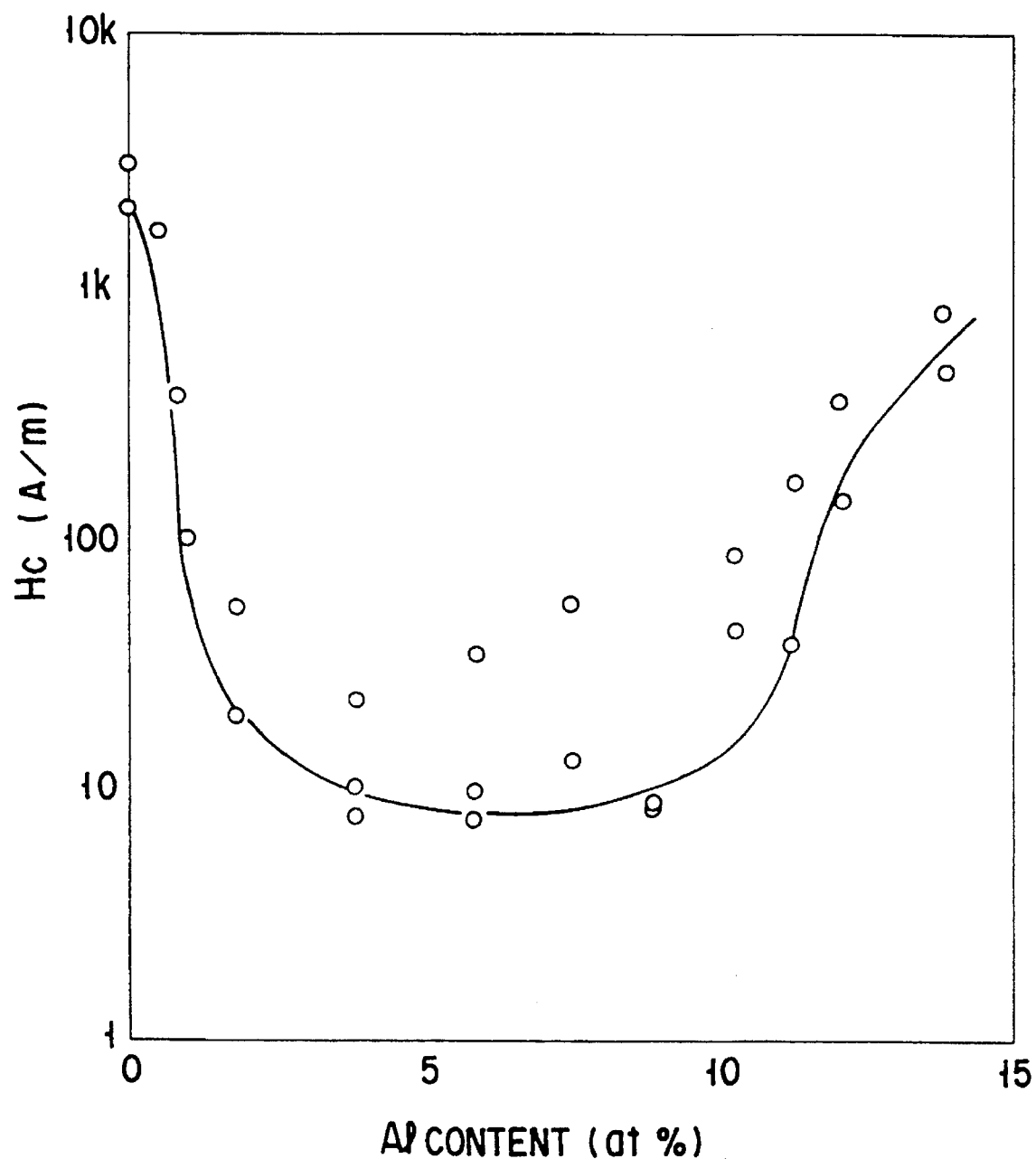
FIG. 8 is a graph showing the relationship between the Al content and Hc with respect to CoFeAl magnetic films.

FIG. 8 shows the relationship between the Al content and Hc with respect to CoFeAl magnetic films containing Al as the additive element.

when Al was used as the additive element, Hc largely decreased even if the additive amount was very small compared to the case in which Ta was used (FIG. 5). That is, in a film having an Al content of about 1 at %, Hc decreased to about 100 A/m. A film having an Al content of about 3 to 10 at % exhibited very low Hc of about 10 A/m. However, when the Al content exceeded 10 at %, Hc began to increase.

The relationship between the crystal structure and the Al content of a magnetic film is as follows. That is, in a film having a low Al content and high Hc, the hcp (100) peak was slightly observed. A film having an appropriate Al content and low Hc was highly fcc (111) oriented and did not include the hcp phase. In a film having a high Al content and high Hc, a CoAl intermetallic compound was formed, and Al phase separation was observed.

Example 3

FIG. 9 shows the relationship between the additive element content and Hc with respect to CoFeT magnetic films containing an element other than Ta and Al as the additive element. When Ti, Nb, Mo, Zr, Hf, or W was used as the additive element, the film exhibited low Hc when the content was about 3 to 8 at %. From the evaluation of the crystal structure, these films were preferentially oriented to fcc (111) within the appropriate content range.

When Pd, Ru, Cr, or Si was used as the additive element, a film having low Hc could not be obtained regardless of the content. On evaluating the crystal structure of these films, the hcp (100) peak was detected.

As described above, it is apparent that for the CoFe-based film, some additive elements promote the fcc (111) or hcp (001) orientation while some additive elements suppress these orientations.

CoFeAlTaN-based magnetic films will be described in Examples 4 to 7 below.

EXAMPLE 4

Crystallized glass was used as a substrate. A composite target consisting of a $Co_{90}Fe_{10}$ alloy or a alloy obtained by adding a given amount of Al to $Co_{90}Fe_{10}$, and a Ta pellet placed thereon was used as a target. A magnetic film having a thickness of 1 μm was formed on the substrate in a gas mixture atmosphere of argon and nitrogen by RF magnetron sputtering. The total content of Ta and Al of the magnetic film was adjusted to 8 to 10 at %. Sputtering was performed in accordance with the following conditions:

| | |
|---|---|
| RF power density: | 0.05 W/mm² |
| Total sputtering gas pressure: | 0.3 Pa |
| Nitrogen gas concentration: | 25% |
| Interelectrode distance: | 60 mm |
| Preliminary evacuation: | 2 × $10^{-4}$ Pa or less |
| Substrate temperature: | about 100° C. |

The obtained film was annealed at a given temperature under a reduced pressure of 2×$10^{-3}$ Pa for 1 hour in a rotating magnetic field of 16 kA/m rotating at 100 rpm.

The physical properties of the obtained magnetic film were measured in the following manner. The coercive force Hc was measured by applying a magnetic field of 250 Oe at maximum in the direction of the hard axis of magnetization of the film. The saturation magnetic flux density Bs was measured with a vibrating sample magnetometer by applying a magnetic field of 10 kOe to the film. The crystal structure of the film was examined by θ–2θ scanning x-ray diffraction using CuKα rays. The nitrogen content of the film was examined by a combination of steam distillation/Nessler absorption spectrophotometry, and Auger electron spectroscopy. The contents of Co, Fe, Ta, and Al of the film were examined by x-ray fluorescence.

FIG. 10 shows the annealing temperature dependency of Hc with respect to the magnetic films formed in accordance with the above conditions by using the Al content of the T component (Al/(Ta+Al), referred to as the substituted Al ratio for Ta hereinafter) as a parameter.

As-made magnetic films will be discussed first. When Al was not added, the film exhibited high Hc of 800 A/m or more. This film also showed a magnetization curve indicating a weak perpendicular magnetic anisotropy. This result coincides with that of the Co-based nitride film described so far. When the substituted Al ratio was 25 to 50%, the Hc decreased to 10 A/m or less. However, when the substituted Al ratio increased to 75% or more, the Hc slightly increased to 40 A/m or more. From these results, it is obvious that an adverse perpendicular magnetic anisotropy can be suppressed by adding Al, and that low Hc can be realized without annealing.

The influence of annealing at 350° to 550° C. will be discussed. In the film not containing Al, high Hc is obtained before annealing, whereas Hc decreased to about 10 A/m by annealing at the above temperature range. In the film having the substituted Al ratio of 10 at % or more, substantially no change was caused in Hc by annealing in the above temperature range.

The influence of annealing at 550° C. or more will be discussed. In the film not containing Al and the films having the substituted Al ratio of 75 at % or more, Hc rapidly increased. In the film having the substituted Al ratio of 10%, however, Hc rapidly decreased. A film having the substituted Al ratio of 10 to 50% exhibited low Hc of 10 A/m or less within the annealing temperature range of 550° to 650° C.

From these results, it is obvious that, if the substituted Al ratio is less than 75%, a heat resistance for 600° C. or more to endure the manufacturing process of a laminated head can be realized.

Figure 11:
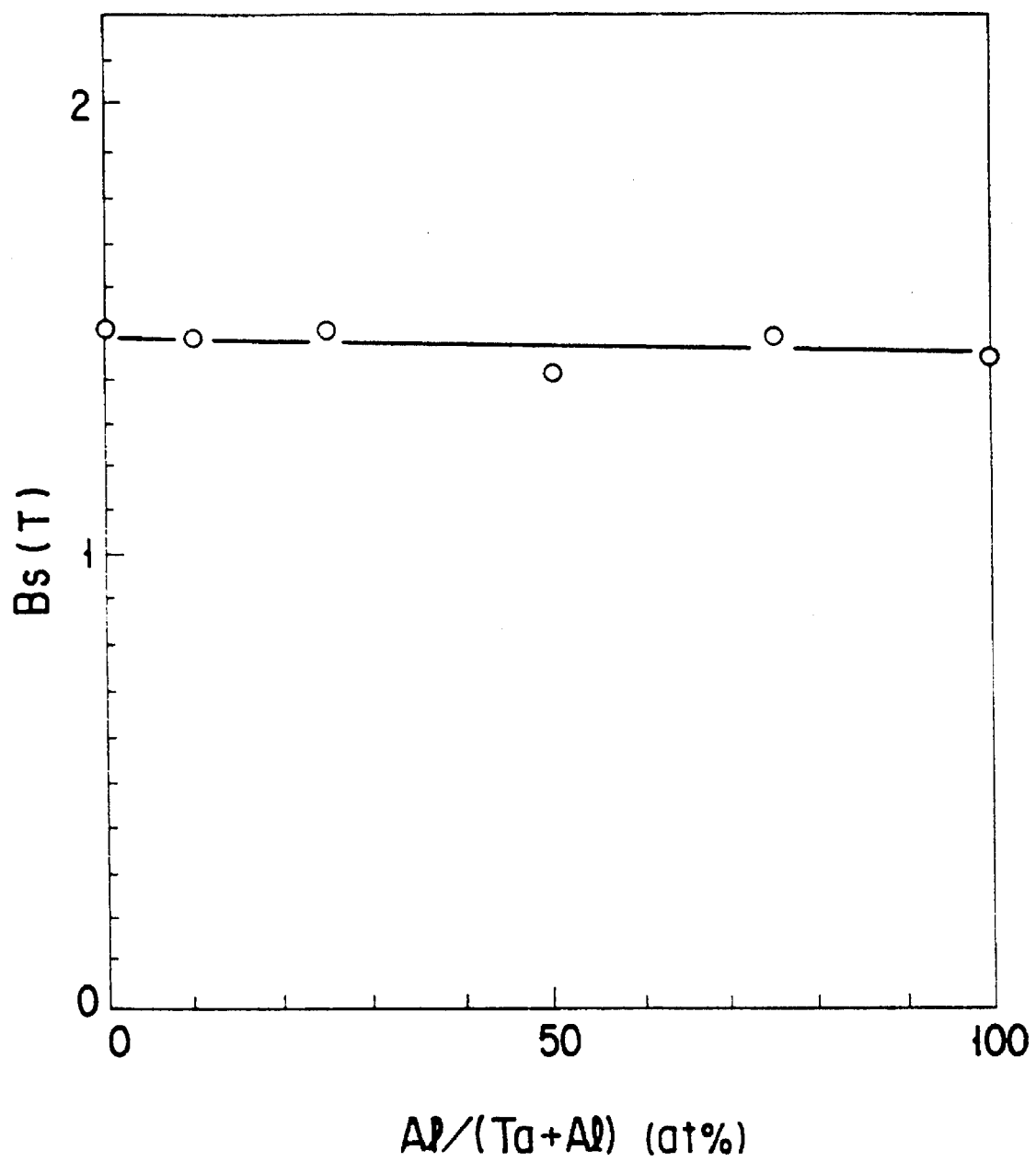
FIG. 11 is a graph showing the relationship between the substituted Al ratio and Bs with respect to CoFeTaAlN-based films annealed at 600° C.

There is the possibility that high Bs might be impaired by partially substituting Ta by Al. FIG. 11 shows the relationship between the substituted Al ratio and Bs of the magnetic film annealed at 600° C. It is seen from FIG. 11 that even when the substituted Al ratio is changed, Bs is changed only slightly, and high Bs of 1.4 to 1.5 T can be obtained.

The reason why the heat resistance of a soft magnetic characteristics was improved upon addition of Al might be because the crystal structure of the film was changed. FIGS. 12A to 12D show the result obtained by examining the substituted Al ratio dependency of the x-ray diffraction curve.

As-made magnetic films will be discussed first. When Al was not added, a considerably broad peak specific to a Co-based amorphous alloy film was observed at 2θ= about 45°. When the substituted Al ratio was 50%, the wider angle side of the broad peak was widened. When the substituted Al ratio was 75%, a clear peak appears at 2θ= about 50°. It is estimated that these changes are attributable to the change in film from the amorphous state to a structure containing crystallite upon Al addition.

The influence of annealing at 450° C. will be discussed. When the substituted Al ratio was 50% or less, a considerably broad peak supposedly corresponding to $TaN_x$ was observed at 2θ= about 35°. Simultaneously, the peak width of 2θ= about 45° decreased. It is estimated that this is because crystallization progresses corresponding to the phase separation between the nitride and non-nitride phases. When the substituted Al ratio was 75% or more, a clear peak corresponding to the nitride did not appear, and peaks at 2θ= about 45° and 50° became apparent. It is estimated that crystal growth progresses in this case as well.

The influence of annealing at 600° C. will be discussed. When Al was not added, or when the substituted Al ratio was 75% or more, the full width at half maximum (FWHM) of the main peak (2θ=about 45°) decreased, and crystal grain growth was apparent. When the substituted Al ratio was 50%, crystal growth was relatively small.

FIG. 13 shows the relationship between the annealing temperature and the FWHM at 2θ=44° to 45° when no Al was added and when the substituted Al ratio was 50% in order to clarify the effect of Al addition to suppress the growth of crystal grains. It is obvious from FIG. 13 that the decrease in FWHM, i.e., the growth of crystal grains by annealing can be suppressed by adding Al.

Figure 12:
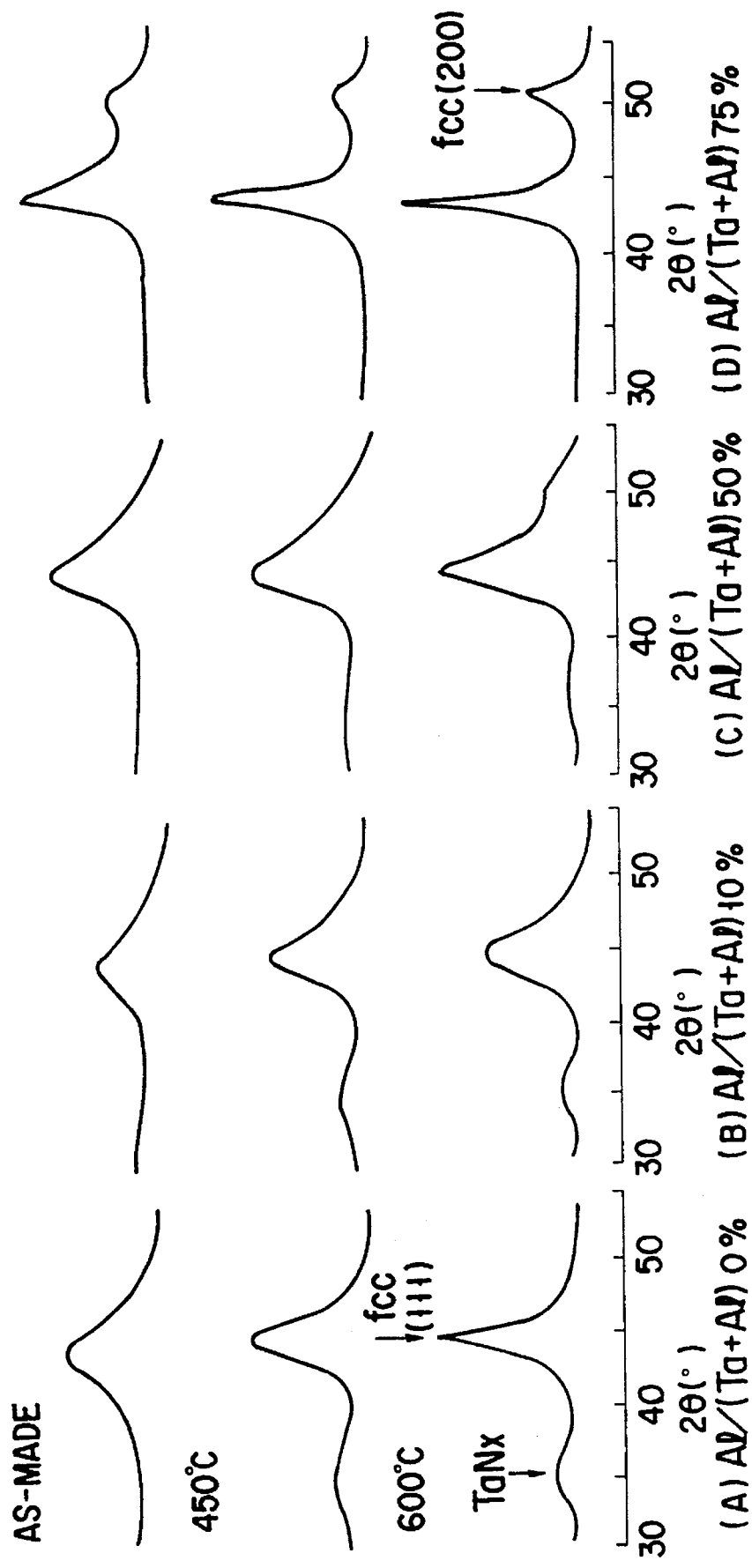
FIGS. 12 displays graphs showing the x-ray diffraction curves of CoFeTaAlN-based magnetic films having different substituted Al ratio by using the annealing temperature as a parameter.

It is obvious from the results of FIGS. 12 and 13 that when Ta is partly substituted by Al up to 50%, although crystallization including a nitride takes place at a relatively low temperature (about 400° C.), further crystal grain growth can be suppressed at a higher temperature. As a result, Hc does not be degraded even by high-temperature annealing.

Figure 14:
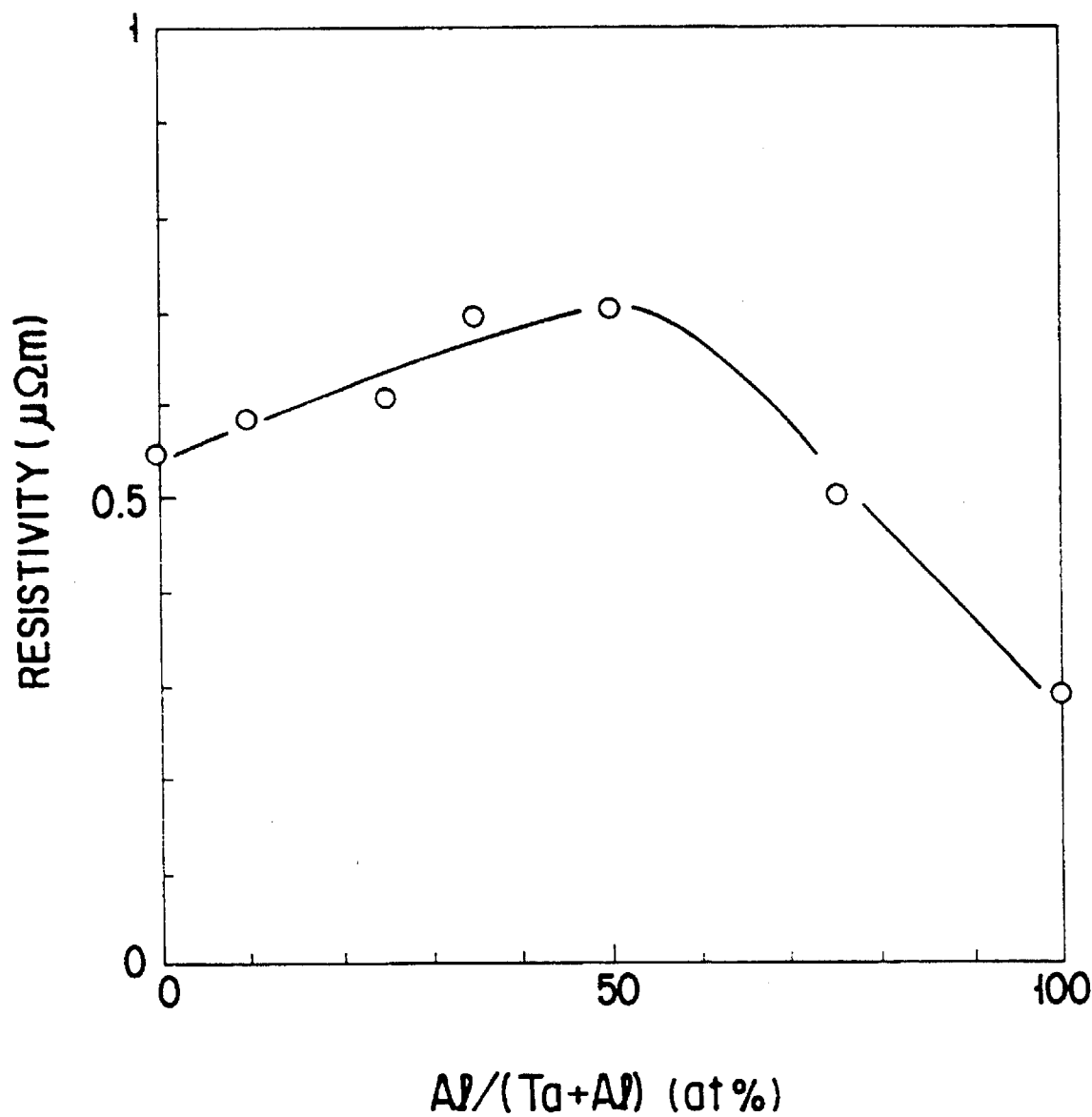
FIG. 14 is a graph showing the relationship between the substituted Al ratio and the resistivity with respect to CoFeTaAlN-based films annealed at 600° C.

The effect of improving the heat resistance of Hc by Al addition has been described above. Another effect of increasing the resistivity by Al addition can also be obtained simultaneously. FIG. 14 shows the relationship between the substituted Al ratio and the resistivity with respect to films annealed at 600° C. The resistivity was 0.55 μΩm when the substituted Al ratio was zero, and 0.7 μΩm when the substituted Al ratio was 50%. However, when the substituted Al ratio increased to 75% or more, the resistivity rapidly decreased. The resistivity increased when the substituted Al ratio was 50% supposedly because of suppression in crystal grain growth. In such a film, since the eddy currents can be suppressed owing to an increase in resistivity, a high RF magnetic permeability can be expected.

When the substituted Al ratio for Ta increased, the corrosion resistance was adversely affected. Table 1 shows the result. Note that the corrosion resistance was evaluated by observing the surface state of the magnetic film with an optical microscope after the magnetic film was left in pH-6.0 water at room temperature for 100 hours. When the substituted Al ratio was 50% or less, no change was observed on the film surface. However, when the substituted Al ratio is further increased, a great surface change caused by rust was observed. It is obvious from this result that when a large amount of Al is added, the corrosion resistance of the magnetic film is degraded.

TABLE 1

| Substituted Al Ratio (%) | Evaluation on Corrosion Resistance |
| --- | --- |
| 0 | No change |
| 10 | No change |
| 25 | No change |
| 50 | No change |
| 75 | Partly discolored |
| 100 | Greatly discolored |

Example 5

Magnetic films were formed by following the same conditions as in Example 4 except that the nitrogen gas concentration was changed in the range of 0 to 50%. The substituted Al ratio for Ta was 10%.

FIG. 15 shows the relationship between the nitrogen gas concentration and Hc with respect to the magnetic films annealed at 600° C. When the nitrogen gas concentration was 5% or less (the nitrogen content of the film was 2 at % or less) or 50% or more (the nitrogen content of the film was 20 at % or more), the films exhibited high Hc of 400 A/m or more. When the nitrogen gas concentration was 5 to 50%, the films exhibited low Hc of 30 A/m or less. From these results, it is obvious that a film having low Hc can be obtained even if annealing is performed at 600° C. by setting the nitrogen content of the film to 2 to 20 at %.

Example 6

Magnetic films were formed by following the same conditions as in Example 4 but by adjusting the Al content of the alloy target and a number of Ta chips, setting the substituted Al ratio for Ta at a substantially constant value (about 50%), and changing b indicating the T component (Ta and Al) content.

Figure 16:
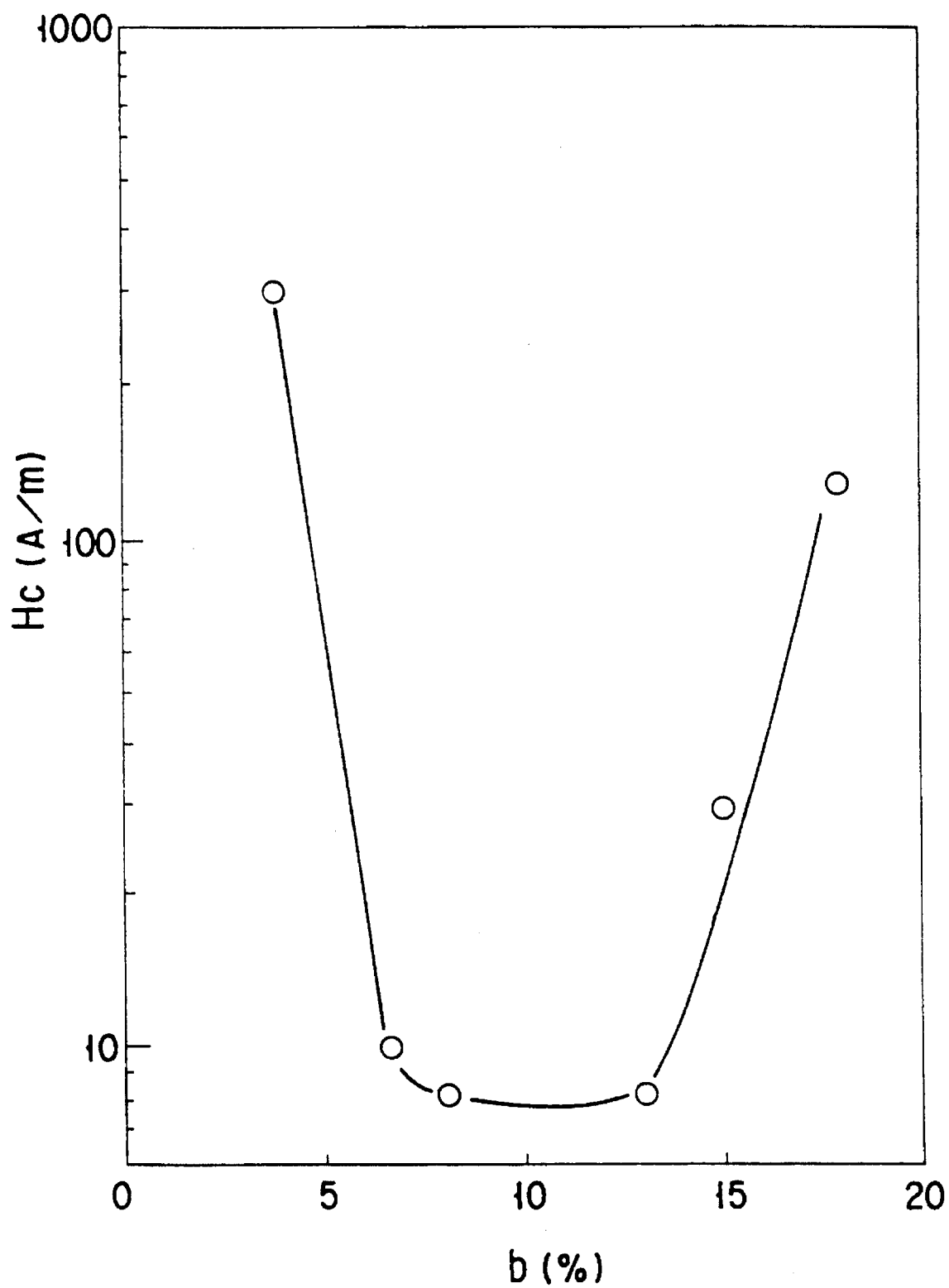
FIG. 16 is a graph showing the relationship between b indicating the T component content and Hc with respect to CoFeTaAlN-based films annealed at 600° C.

FIG. 16 shows the relation between b and Hc with respect to the films annealed at 600° C. When the content b was 4 at %, the film exhibited a relatively high Hc of about 300 A/m. When the content b was 5 to 15 at %, the films exhibited low Hc of 30 A/m or less. When the content b was 17.5 at %, the film exhibited relatively high Hc of more than 100 A/m. It is obvious that low Hc of 30 A/m can be obtained when the content b satisfies 4 at % <b<15 at %.

Figure 17:
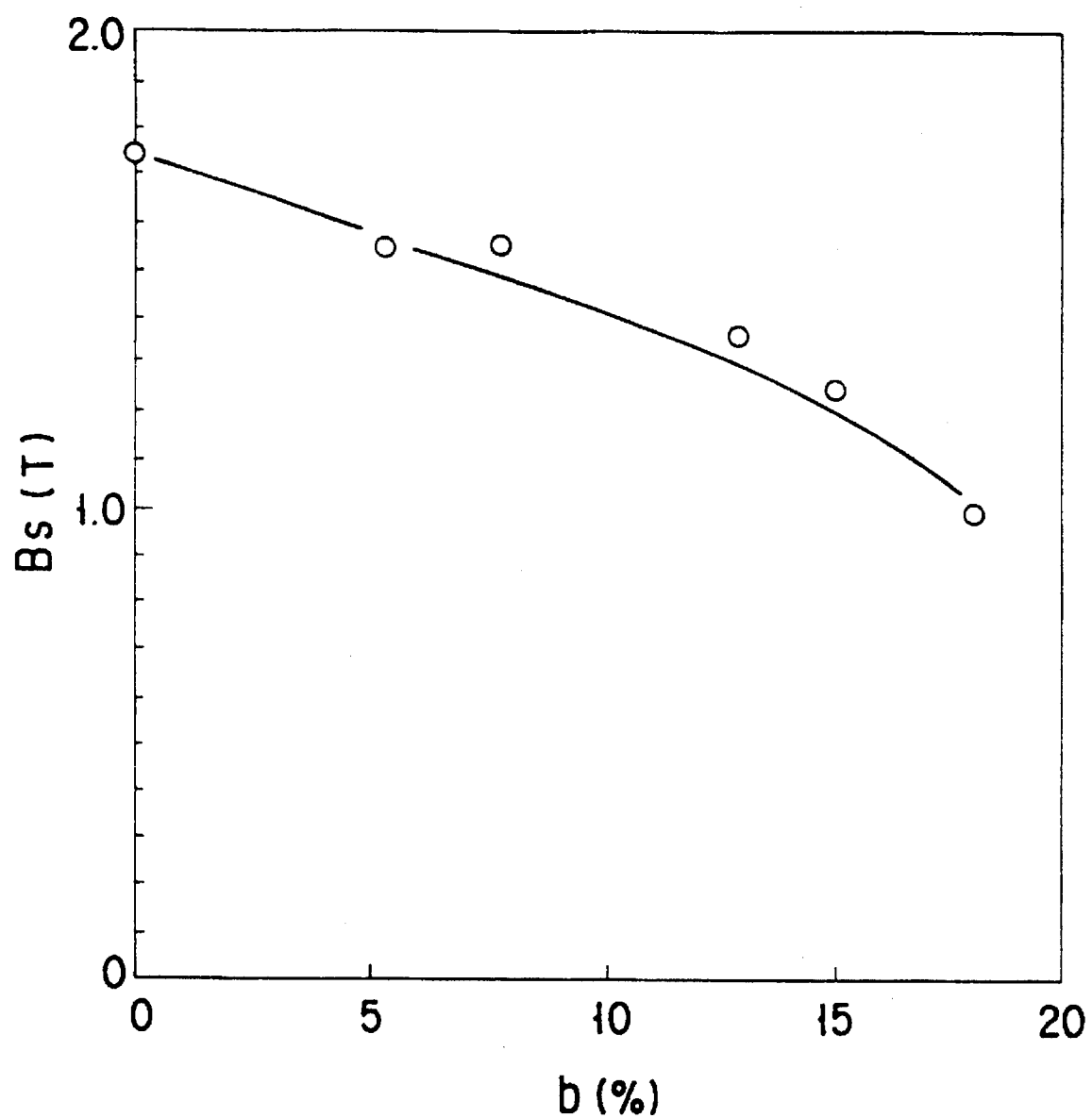
FIG. 17 is a graph showing the relationship between the T component content b and Bs with respect to CoFeTaAlN-based films.

FIG. 17 shows the relationship between the content b and Bs. Although Bs moderately decreased when the content b is increased, high Bs of 1.25 T exceeding that of the conventional NiFe or FeAlSi alloy can be obtained even if b=15 at %.

Example 7

In the above description, the films contained Ta and Al as the T component. However, the similar effect can be obtained even if Zr, Nb, Hf, Ti, Cr, Mo, or W is used as the transition metal in the T component in place of Ta. Table 2 shows the results. In Table 2, Hc and Bs of the respective magnetic films after annealing at 600° C. are shown. Any magnetic film exhibited excellent magnetic characteristics including Hc of 30 A/m or less and Bs of 1.2 T or more.

TABLE 2

| Composition | Hc (A/m) | Bs (T) |
|---|---|---|
| $(Co_{84}Fe_7Zr_{6.5}Al_{2.5})_{90}N_{10}$ | 10 | 1.50 |
| $(Co_{89.5}Zr_6Al_6)_{90}N_{10}$ | 8 | 1.40 |
| $(Co_{92}Hf_7Al_1)_{93}N_7$ | 15 | 1.50 |
| $(Co_{79}Fe_{12}Nb_{6.5}Al_{2.5})_{92}N_8$ | 8 | 1.55 |
| $(Co_{83}Fe_7Nb_6Al_4)_{91}N_9$ | 25 | 1.55 |
| $(Co_{83}Fe_5Mo_{9.5}Al_2)_{93}N_7$ | 30 | 1.40 |

Embodiments of a magnetic head to which the magnetic film according to the present invention is applied will be described below with reference to FIGS. 18 to 21.

FIG. 18 is a sectional view of a thin film magnetic head corresponding to a longitudinal recording type hard disk. A ferromagnetic film 2 is formed on a substrate 1, and an insulator 3 forming a predetermined gap and a first insulating layer 4 is formed on the film 2. A coil 5 is wound on the first insulating layer 4, and a second insulating layer 6 is formed to cover the coil 5. A ferromagnetic film 7 is formed on the surface of the insulating layers to be partly in contact with the ferromagnetic film 2. The gap 3 is formed at the front end of the head between the ferromagnetic films 2 and 7. A protective film 8 is formed on the ferromagnetic film 7.

The ferromagnetic film according to the present invention has high Bs compared to that of the conventional NiFe film or Co-based amorphous film. Therefore, sufficient recording can be performed even for a medium having high coercive force. Since the resistivity is higher than in the conventional Co-based nitride films not containing Al, recording and reproduction with excellent RF characteristics can be performed. Since this ferromagnetic film exhibits low Hc even if it is not annealed, it can use even an organic material having a low heat resistance as the insulating layer, thus providing a low-cost magnetic head.

FIG. 19 is a sectional view showing a thin film magnetic head of a perpendicular recording type. A main magnetic pole 12 consisting of the ferromagnetic film according to the present invention and a first insulating layer 13 are sequentially formed on a substrate 11. A coil 14 is wound on the first insulating layer 13, and a second insulating layer 15 is formed to cover the coil 14. A return-path magnetic body 16 is formed on the surfaces of the insulating layers to be partly in contact with the main magnetic pole 12. A protective film 17 is formed on the returnpath magnetic body 16.

Since the ferromagnetic film of the present invention used in the main magnetic pole 12 has Bs higher than that of a conventional Co-based amorphous film, the thickness of the main magnetic pole can be further reduced to realize high-density perpendicular magnetic recording.

FIG. 20 is a perspective view showing a metal-in-gap head. Ferromagnetic films 24 according to the present invention are formed on opposing surfaces of a pair of ferrite cores 21 and 22 through interlayers 23. The interlayers 23 are used to enhance the adhesion strength and to prevent mutual diffusion between the ferrite cores 21 and 22 and the ferromagnetic films 24. Interlayers 23 preferably consist of Cr, $SiO_2$, or NiFe. The ferrite cores 21 and 23 are welded by a glass 26 to form a gap 25 between the ferromagnetic films 24. A coil 27 is wound on the ferrite core 21.

To manufacture this head, glass welding is performed at a high temperature of about 550° C. Since the ferromagnetic film according to the present invention has a heat resistance of 600° C., it can be applied to this head. Since the ferromagnetic film according to the present invention has a higher resistivity after annealing than that of the Co-based nitride films not containing Al, excellent RF characteristics can be obtained. Since a metal-in-gap head has a large thickness, a ferromagnetic film having a particularly high resistivity is required.

FIG. 21 is a perspective view showing a laminated head. Laminate layers each obtained by alternately forming ferromagnetic films 33 according to the present invention and insulating layers 34 are formed on a pair of non-magnetic substrates 31 through intermediate layers 32 that increase the adhesion force. Substrates 36 are formed on these laminate layers through first welding glass layers 35. A pair of blocks 37 and 38 having the above structure are bonded through a second welding glass layer 39 to form a predetermined gap. A coil 40 is wound on one block 37.

To manufacture this laminated head, the first glass layers 35 must be stable during welding the second glass layer 39. For this purpose, the welding temperature of the first glass layers 35 is preferably higher than 600° C. which is higher than that of the second glass layer 39. Since the ferromagnetic film according to the present invention can sufficiently withstand such a high-temperature process, it can be applied to the laminated head.

CoFeTaN-based magnetic films will be described in Examples 8 to 12 as follows.

Example 8

Crystallized glass was used as a substrate. A Cr film having a thickness of about 10 nm was formed on the substrate. The Cr film is provided to maintain the adhesion strength of a magnetic film with the substrate. A composite target consisting of a $Co_{90}Fe_{10}$ alloy and a Ta pellet placed thereon was used as a target. A CoFeTaN magnetic film having a thickness of 3 μm was formed on the substrate by RF magnetron sputtering. Sputtering was performed in accordance with the following conditions:

| | |
|---|---|
| RF power density: | 0.05 W/mm² |
| Total sputtering gas pressure: | 0.3 Pa |
| Nitrogen gas concentration: | 25% |
| Interelectrode distance: | 60 mm |
| Preliminary evacuation: | $1 \times 10^{-4}$ Pa or less |
| Substrate temperature: | about 100° C. |

The obtained film was annealed at a given temperature under a reduced pressure of $2 \times 10^{-3}$ Pa for 1 hour in a rotating magnetic field of 16 kA/m rotating at 100 rpm.

The physical properties of the obtained magnetic film was measured in the following manner. Coercive force Hc was measured with a vibrating sample magnetometer by applying a magnetic field of 20 kA/m at maximum in the direction of the hard axis of magnetization of the magnetic film. Effective magnetic permeability μ was measured at a frequency of 1 MHz by the 8-figured coil method. Saturation magnetic flux density Bs was measured with a vibrating sample magnetometer by applying a magnetic field of 10 kOe to the film. An anisotropy magnetic field Hk caused by the longitudinal uniaxial magnetic anisotropy was obtained by extending the linear minor loop magnetization curve in the direction of the hard axis of magnetization to the saturation point. The saturation magnetostriction λs was obtained from a change in anisotropy magnetic field Hλ obtained when a unidirectional stress is applied to the film. Here, the Young's modulus and Poisson ratio of the film were substituted by those of Co. The crystal structure of the film was examined by θ–2θ scanning x-ray diffraction using CuKα rays. The nitrogen content of the film was examined by a combination of steam distillation/Nessler absorption spectrophotometry, and Auger electron spectroscopy. The Co, Fe, Ta, and Al contents of the film were examined by x-ray fluorescence analysis.

The nitrogen content in the as-made film was 12 at %, and decreased to about 10 at % when the film was annealed at 700° C. for 1 hour. The composition of the metal components in the magnetic film was $Co_{83}Fe_9Ta_8$.

Figure 22:
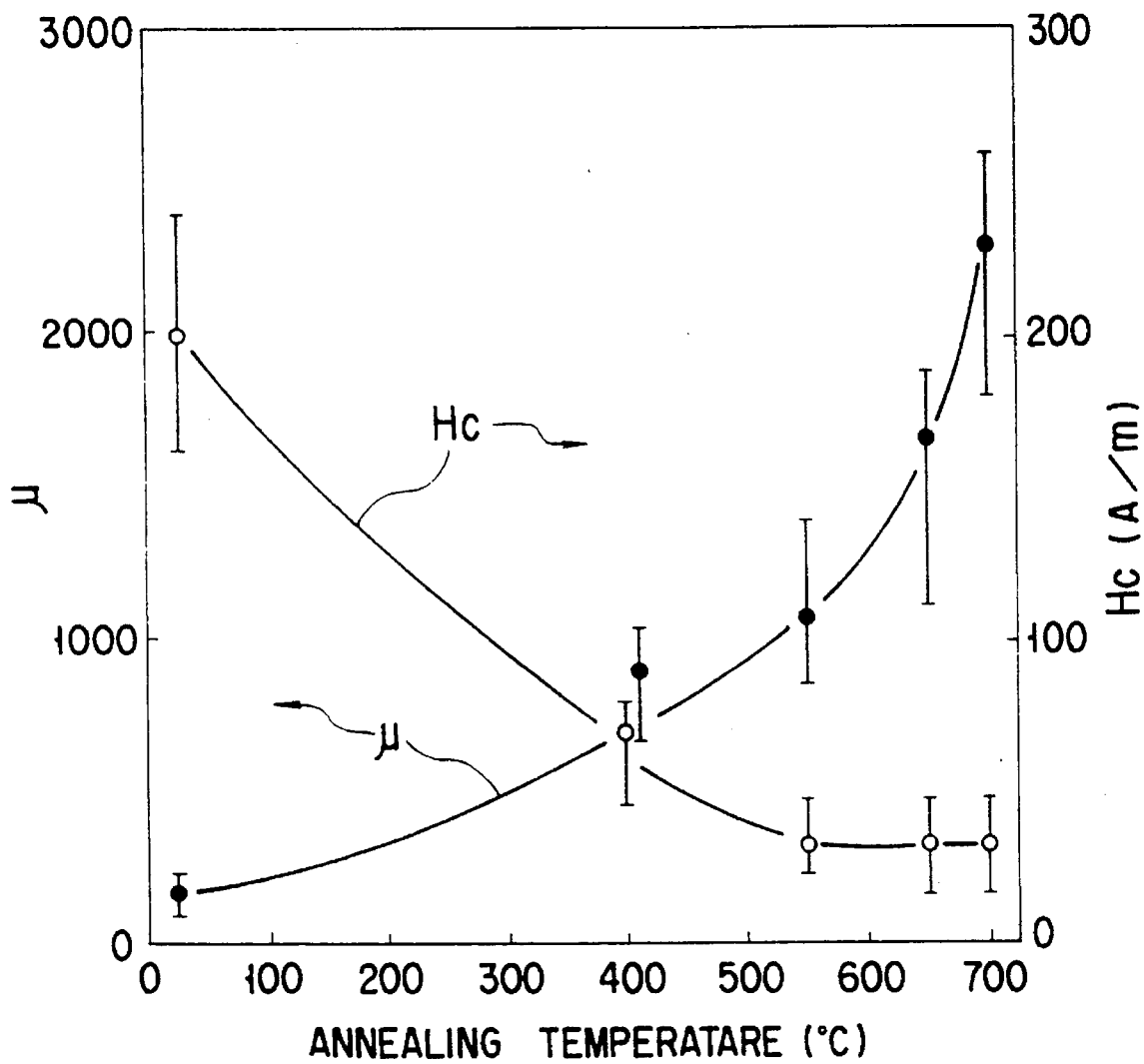
FIG. 22 is a graph showing the relationship among the annealing temperature, μ and Hc of with respect to a CoFeTaN film.

FIG. 22 shows the relationship among the annealing temperature, the effective magnetic permeability μ and the coercive force Hc with respect to the magnetic film manufactured in accordance with the above conditions. Since some anisotropy (anisotropy magnetic field Hk= 100 to 300 A/m) was present within the film surface, the magnetic permeability varied in accordance with the magnetic field applying direction within the film surface. Here, the maximum magnetic permeability was represented in FIG. 22. The coercive force Hc was not almost changed regardless of the magnetic field applying direction. In FIG. 22, error bars represent variations in the plurality of samples.

The as-made film exhibited high Hc of about 200 A/m and low μ0 of about 180. As the annealing temperature was raised, Hc decreased, and μ increased. When the annealing temperature was between 550° C. and 700° C., low Hc of about 30 A/m and high μ of 100 or more were obtained.

FIG. 23 shows the relationship among the annealing temperature, Bs and saturation magnetostriction λs. As the annealing temperature was raised, Bs increased from 1.4 T to 1.7 T. The saturation magnetostriction λs of the as-made film could not be measured since the as-made film did not have excellent soft magnetism. When the annealing temperature was raised from 400° C,. to 700° C., λs decreased from $+1 \times 10^{-5}$ to $+2 \times 10^{-6}$. It is obvious that high Bs of 1.7 T and low λs of $+2 \times 10^{-6}$ can be obtained by performing annealing at about 700° C.

The results of the magnetic films annealed in the rotating magnetic field and having a low uniaxial anisotropy were as described above. Note that it is sometimes preferable to impart an appropriate uniaxial magnetic anisotropy to a magnetic film, depending on a head structure to which the film is applied, in order to stabilize the magnetic domains. A method of controlling the uniaxial magnetic anisotropy will be described.

First, a film is pre-annealed at a given temperature in a fixed magnetic field to impart a uniaxial magnetic anisotropy to the film. FIG. 24 shows the relationship among the pre-annealing temperature, Hk and μ. Although Hk was as large as 2,800 A/m when the annealing temperature was 400° C., it decreased to 1,350 A/m when the annealing temperature was raised to 700° C. In response to this change in Hk, the magnetic permeability μ increased from 350 to 700. The broken line in FIG. 24 represents a change in magnetic permeability obtained from Hk under an assumption that ideal magnetization rotation occurs. The change in ideal magnetic permeability substantially coincides with the actually measured change in magnetic permeability.

Figure 25:
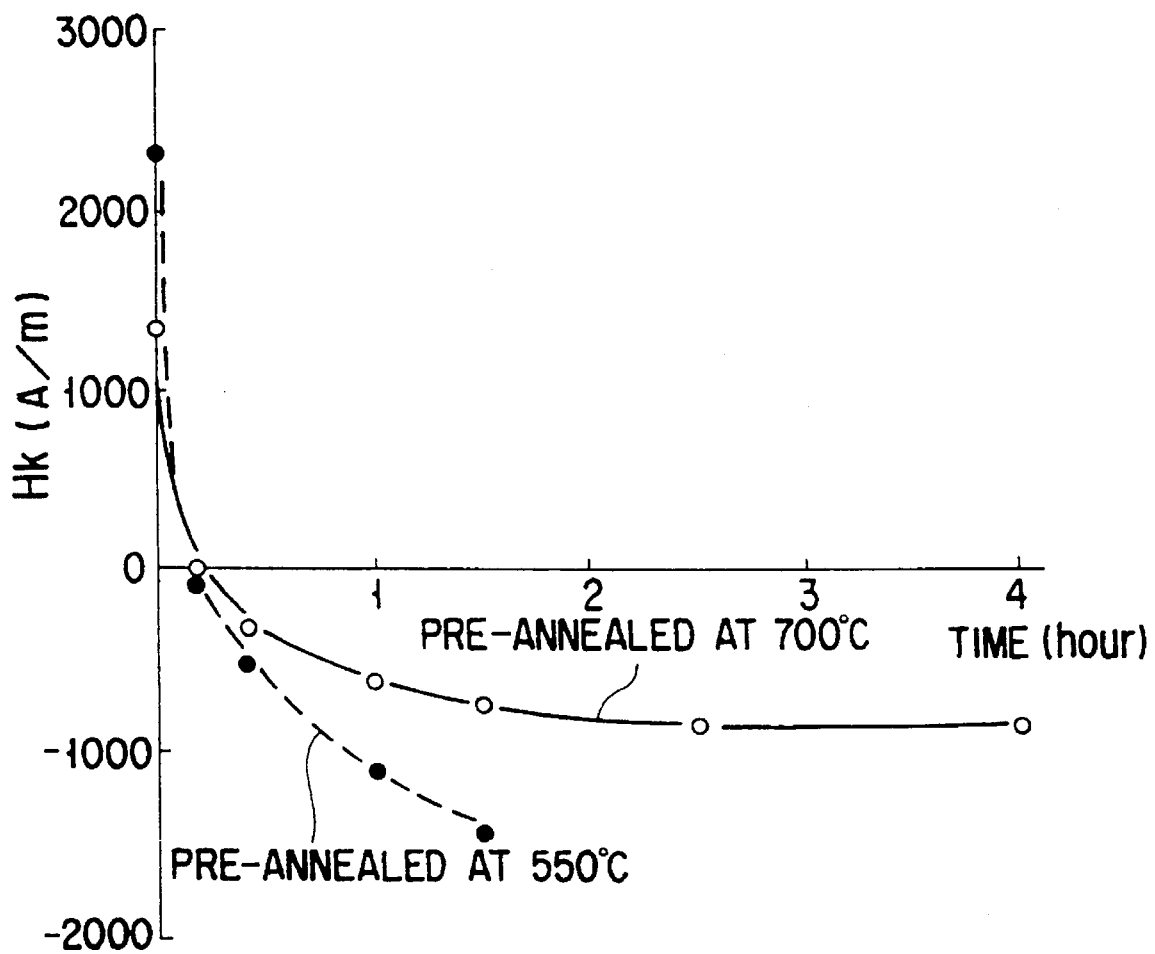
FIG. 25 is a graph showing the relationship between the secondary annealing time and Hc with respect to a CoFeTaN film.

Then, a fixed magnetic field is applied in the direction perpendicular to the direction of magnetization for pre-annealing at a temperature of 400° to 600° C., which is lower than that in pre-annealing, and secondary annealing is performed for a given period of time to impart a uniaxial magnetic anisotropy to the film. FIG. 25 shows the relationship between the secondary annealing time and Hk. Referring to FIG. 25, when Hk has a positive value, the magnetic field applying direction in pre-annealing is the easy axis of magnetization, and when Hk has a negative value, the direction perpendicular to the magnetic field applying direction in pre-annealing is the easy axis of magnetization. As is obvious from FIG. 25, Hk can be controlled by the secondary annealing time. The value range of Hk is 0 to 960 A/m in a film pre-annealed at 700° C., and is 0 to 1,420 A/m in a film pre-annealed at 550° C. In the film pre-annealed at 700° C., Hk is not substantially changed even after it is secondarily annealed for 2.5 hours or more. However, this value of Hk is lower than that obtained immediately after pre-annealing by about 400 A/m. Hk can be controlled not by the time period of the secondary annealing but by its temperature as well. Hk can also be controlled by pre-annealing the film in the rotating magnetic field, and secondarily annealing the film in the fixed magnetic field while changing the time or temperature.

Figure 26:
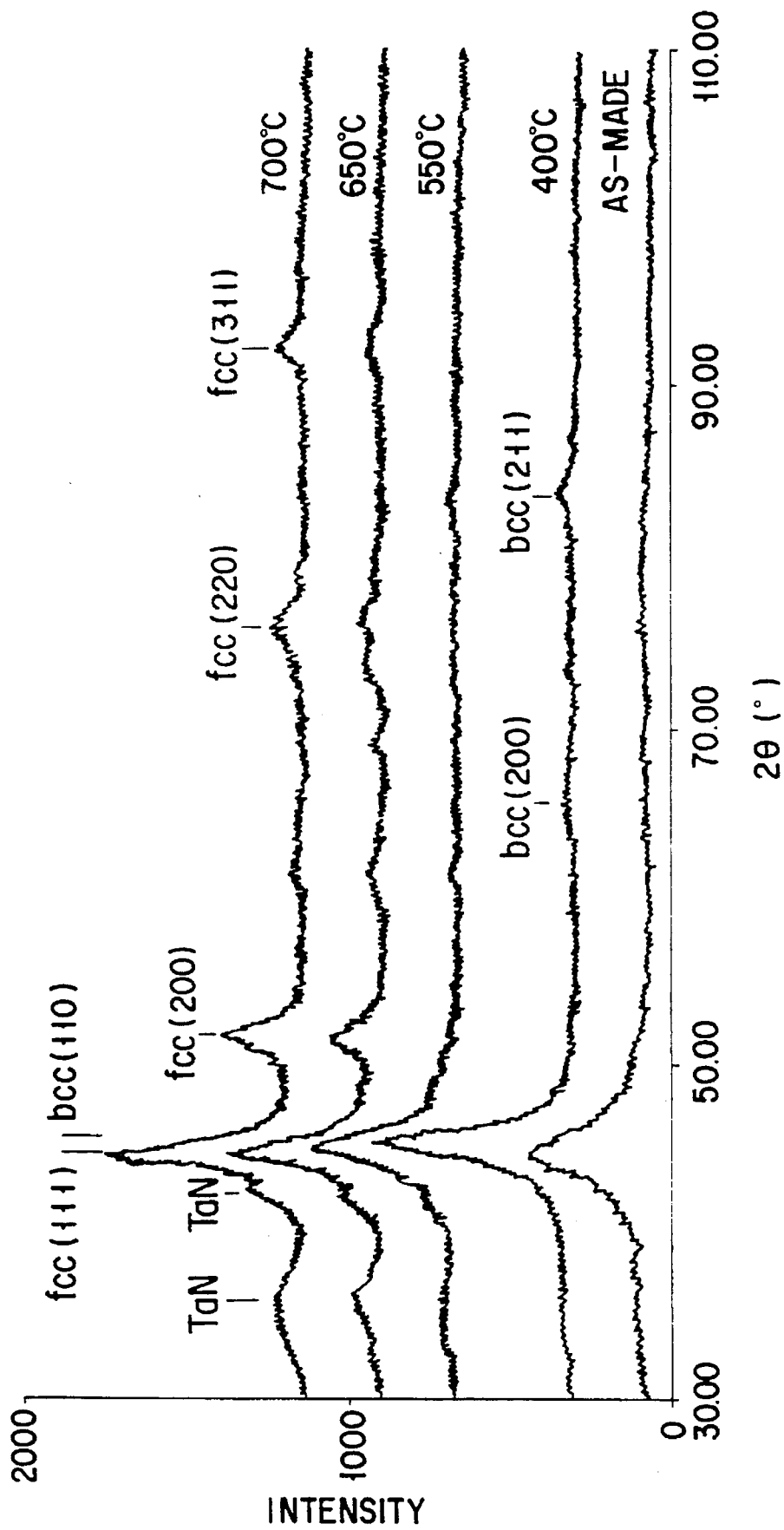
FIG. 26 is a graph showing the annealing temperature dependency of the x-ray diffraction curve of a CoFeTaN film.
Figure 27:
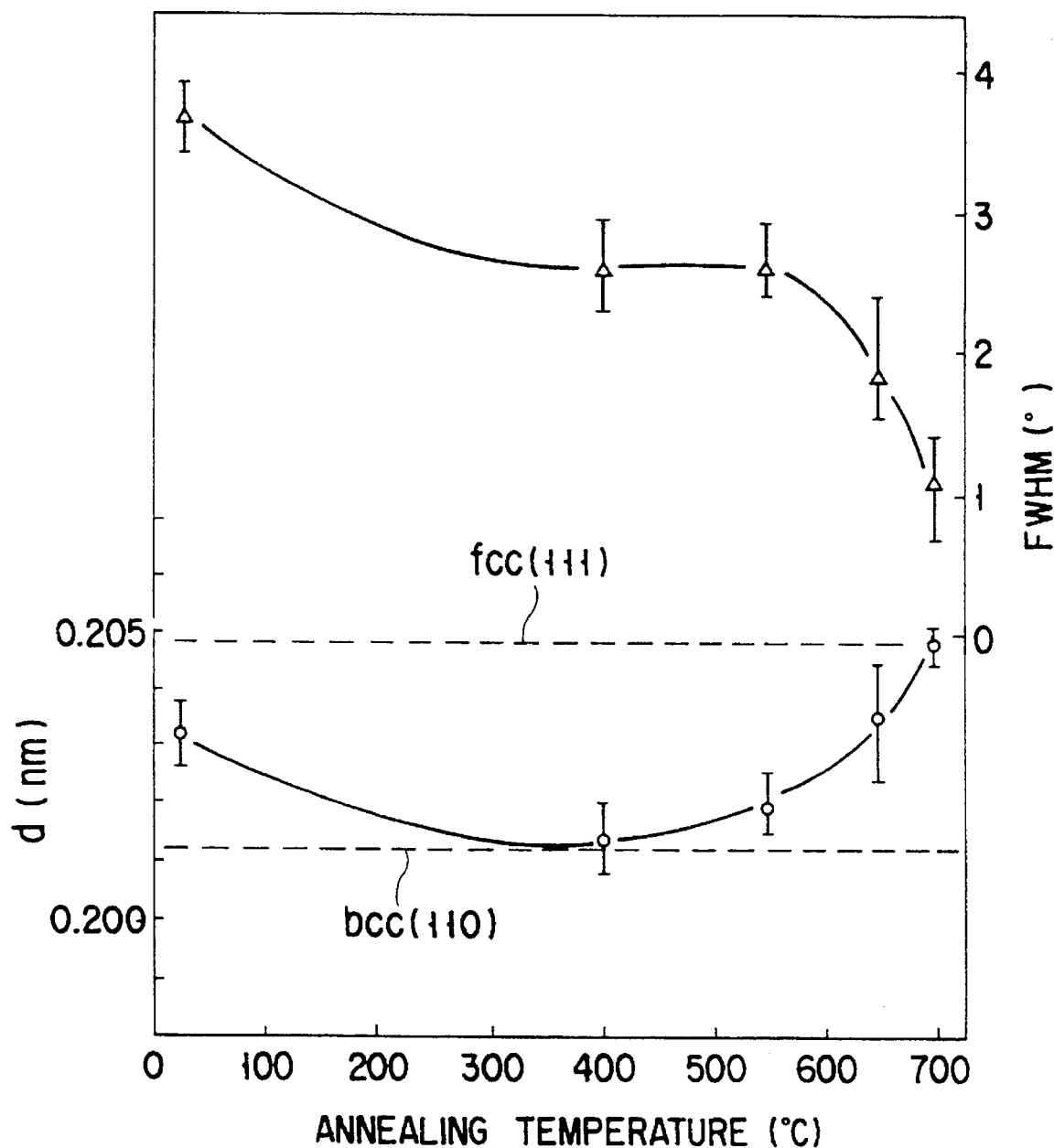
FIG. 27 is a graph showing the relationship among the annealing temperature, FWHM of the main peak of the x-ray diffraction curve, and the spacing d with respect to a CoFeTaN film.

The annealing dependency of the magnetic characteristics of the film described above is strongly correlated to the crystal structure, as will be described below. FIG. 26 shows the annealing temperature dependency of the x-ray diffraction curves. FIG. 27 shows the relationship among the annealing temperature, FWHM of the main peak appearing in the x-ray diffraction curve at 2θ=44° to 45° and a surface-to-surface spacing d.

In the as-made film, only a broad peak similar to that of the Co-based amorphous film was detected. In a film annealed at 400° C., the main peak was shifted to a position identified as the bcc (110) peak, and an increase in peak intensity and a decrease in FWHM were observed. It is obvious from FIG. 27 that the spacing d takes a value corresponding to the bcc-phase (110) plane. In addition to this peak, bcc-phase (200) and (211) peaks, although weak, were detected. From these results, it is obvious that the film annealed at 400° C. comprises bcc crystallite.

In the film annealed at 550° to 700° C., the main peak was shifted to a position identified as the fcc (111) peak of 2θ= about 44°. In the film annealed at 600° to 700° C., the fcc-phase (200), (220), and (311) peaks, and a peak corresponding to TaN were detected, in addition to the peaks described above. It is obvious from FIG. 27 that in the film annealed at 700° C. the spacing d takes a value corresponding to the fcc-phase (111) plane. From these results, it is obvious that, in the film annealed at 700° C., phase transformation to the fcc phase and the TaN phase is caused. Note that since FWHM decreases along with the phase transformation, it is assumed that the crystal grain size increases. The crystal structure was observed with a transmission electron microscope. In the film annealed at 550° C., the average crystal grain size was about 5 nm. In a film annealed at 700° C., the average crystal grain size was about 10 nm and was not so much larger. The excellent soft magnetism can be obtained even if annealing is performed at 700° C. probably because the crystallite are maintained in this manner.

The relationship between the crystal phase and the magnetic characteristics will be summarized on the basis of the above results. The bcc phase corresponds to high $\lambda s$, and the fcc phase corresponds to low $\lambda s$. Since the conventional amorphous CoFeTa film has high $\lambda s$ of about $+1\times10^{-5}$, it cannot be easily applied to a magnetic head. In contrast to this, the magnetic film according to the present invention can realize low $\lambda s$ by stabilizing the fcc phase having small amounts of Ta and N solid solutions, and thus can be applied to a magnetic head.

The similar effect to that described above was obtained even when Nb was used in place of Ta.

Example 9

Composite targets consisting of CoFe alloys having different Fe contents and Ta pallets placed thereon were used as the targets. The nitrogen concentration in the sputtering gas was set to 15% or 25%. The Ta content in the magnetic film was adjusted to be almost the same as that in Example 8. Except for that, CoFeTaN magnetic films were formed on the substrates in accordance with the same conditions as in Example 8. The obtained magnetic films were annealed at a given temperature in a rotating magnetic field for 1 hour.

FIG. 28 shows the relationship between the Fe content of the M component (Co+Fe) and the coercive force Hc with respect to the magnetic films annealed at 550° C. Of the films formed in an atmosphere having a nitrogen concentration of 15%, a film not containing Fe exhibited high Hc of about 240 A/m, while a film having an Fe content of 2.5 at % or more exhibited low Hc of 80 A/m or less. Of the films formed in an atmosphere having a nitrogen concentration of 25%, a film having an Fe content of 5 at % or less exhibited high Hc of 200 A/m or more, while a film having an Fe content of 7.5 at % or more exhibited low Hc of 80 A/m or less. In this manner, Hc tends to increase as the Fe content is decreased or as the nitrogen concentration is increased.

Figure 29:
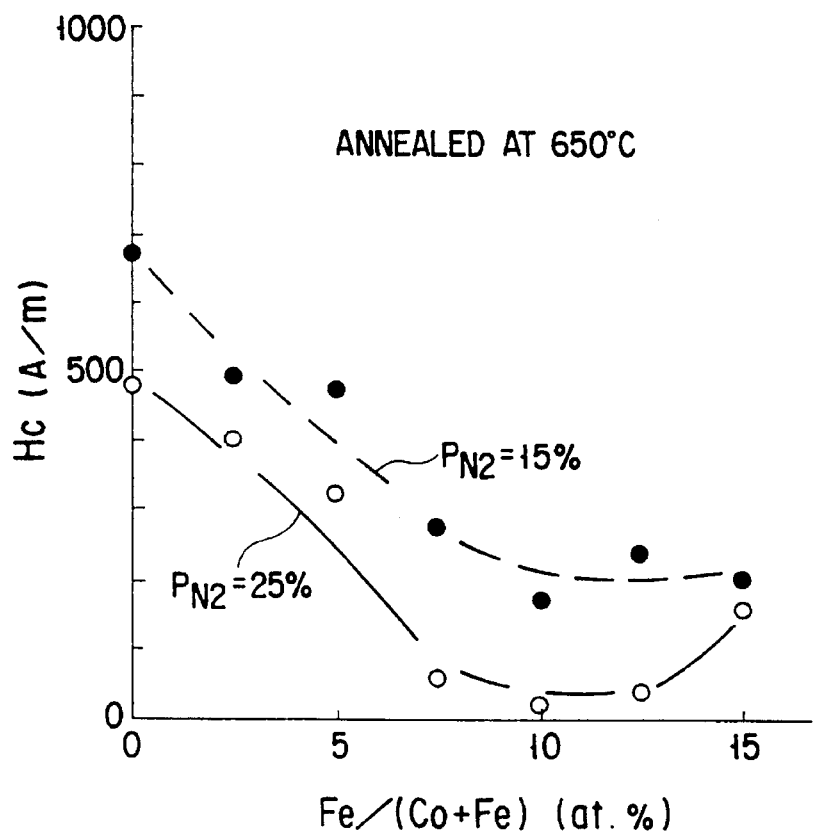
FIG. 29 is a graph showing the relationship between the Fe content of the M component (Co+Fe) and Hc with respect to CoFeTaN-based films annealed at 650° C.

FIG. 29 shows the relationship between the Fe content of the M component (Co+Fe) and Hc with respect to the magnetic films annealed at 650° C. In a film formed in an atmosphere having a nitrogen concentration of 15%, Hc increased regardless of the Fe content compared to a film annealed at 550° C. The values of Hc were respectively 200 A/m or more, and the resultant films were thus hard to be applied to a magnetic head. In a film formed in an atmosphere having a nitrogen concentration of 25%, low Hc of 80 A/m or less was obtained by setting the Fe content to 7.5 to 12.5%. Although not shown, low Hc was similarly obtained even when the film was annealed at 700° C.

Figure 30:
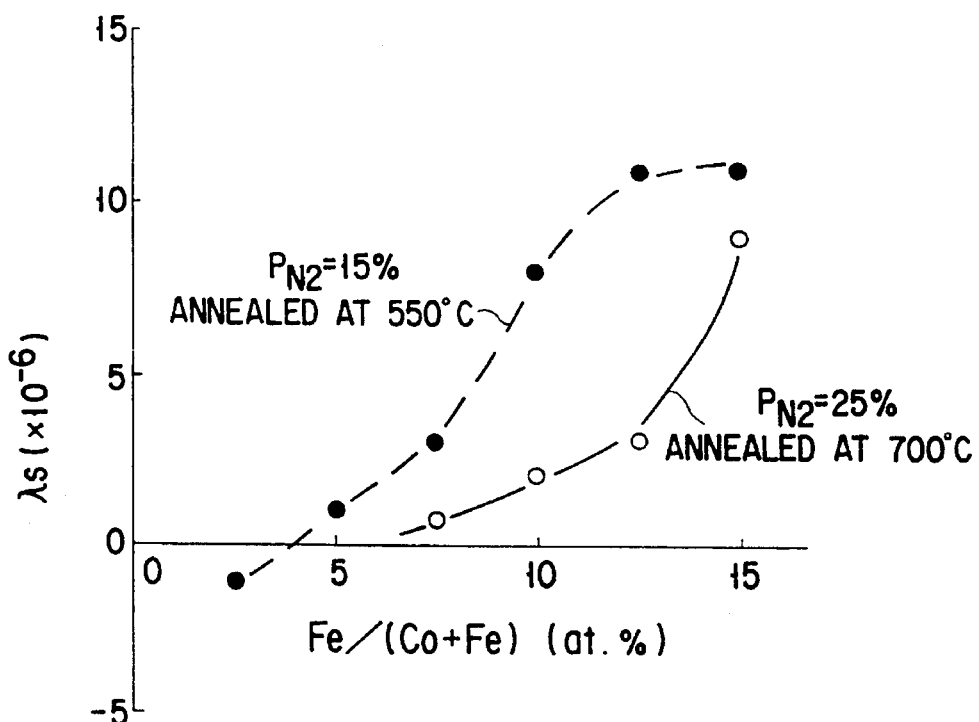
FIG. 30 is a graph showing the relationship between the Fe content of the M component and λs with respect to CoFeTaN-based films.

However, it is found that $\lambda s$ of the magnetic film tends to undesirably increase when the Fe content is excessively increased. FIG. 30 shows the relationship between the Fe content of the M component (Co+Fe) and $\lambda s$. FIG. 30 shows a case in which the film formed in an atmosphere having a nitrogen concentration of 15% was annealed at 550° C., and a case in which the film formed in an atmosphere having a nitrogen concentration of 25% was annealed at 700° C. In the former case, an increase in $\lambda s$ accompanying an increase in the Fe content is particularly large. In the latter case, if the film had an Fe content of 12.5% or less, the absolute value of $\lambda s$ was maintained at a low value of $3\times10^{-6}$ or less. However, if the film had an Fe content of 15%, the absolute value of $\lambda s$ became a large value of $1\times10^{-5}$ or more.

From the above results, regarding a magnetic film to be applied to an MIG head which has a glass welding process at about 550° C., the Fe content of the M component is preferably set within the range of 2.5 to 12.5%. If the Fe content falls within this range, low Hc of 80 A/m or less and low $\lambda s$ of $3\times10^{-6}$ or less can be obtained. Regarding a magnetic film to be applied to a laminated head which has a glass welding process at about 650° C., the Fe content of the M component is preferably set within the range of 7.5 to 12.5%.

Figure 31:
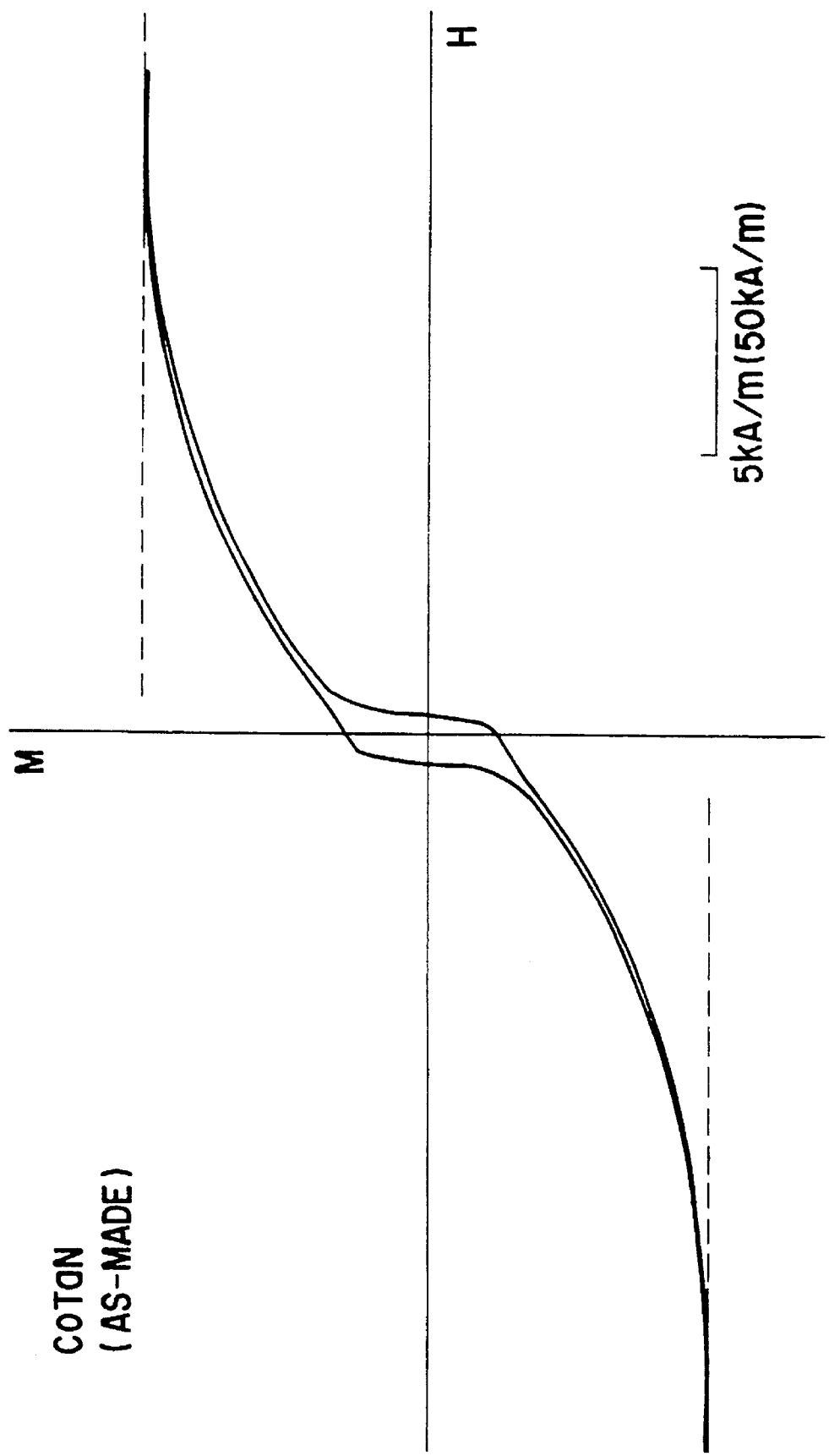
FIG. 31 is a graph showing the magnetization curve of a CoTaN-based magnetic film formed in an atmosphere having a nitrogen concentration of 25%.

The cause that Hc increases upon a decrease in Fe content of the M component, as shown in FIGS. 28 and 29, will be discussed. It is reported that in a Co-based nitride film not containing Fe, a perpendicular magnetic anisotropy occurs due to growth of a columnar crystal, and hence low Hc cannot be obtained. FIG. 31 shows a magnetization curve of typical CoTaN film formed in an atmosphere having a nitrogen concentration of 25%, not containing Fe, and having high Hc. Referring to FIG. 31, portions of the magnetization curve within the range indicated by broken lines are obtained at a magnetic field of 10 times that used for the central portion. As shown in FIG. 31, magnetization is hard to saturate in this magnetization curve, which suggests a perpendicular magnetic anisotropy.

Figure 32:
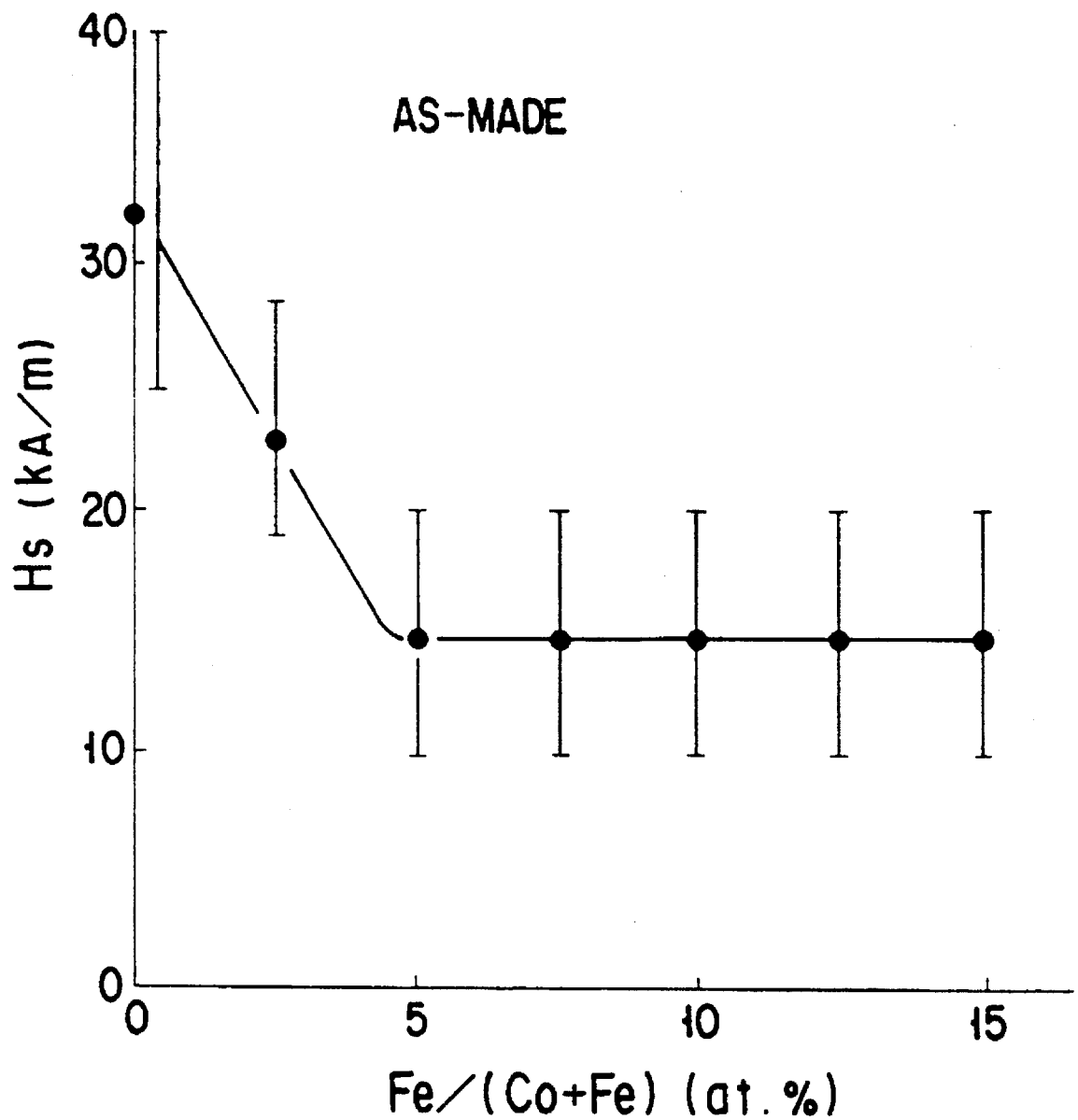
FIG. 32 is a graph showing the relationship between the Fe content of the M component and a saturation magnetic field Hs with respect to CoFeTaN-based films.

FIG. 32 shows the relationship between the Fe content of the M component and a saturation magnetic field HS. HS can be used almost as a measure of the perpendicular magnetic anisotropy. In a film having an Fe content of 2.5 at % or less, its Hs is high, and a perpendicular magnetic anisotropy is apparent. In this manner, it is obvious that an increase in the perpendicular magnetic anisotropy and an increase in Hc are correlated to each other.

Figure 33A:
FIGS. 33A to 33C are cross sectional photographs of the CoFeTaN-based films having different Fe contents by field emission scanning electron microscopy (FESEM)
Figure 33B:
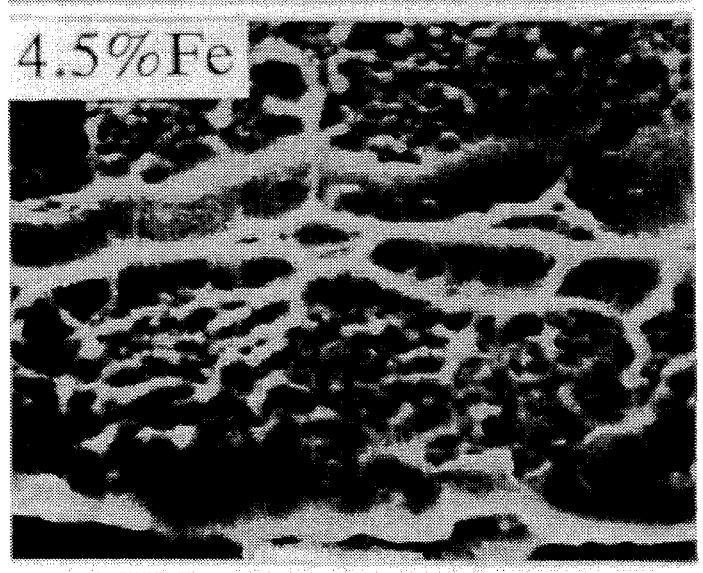
Figure 33C:
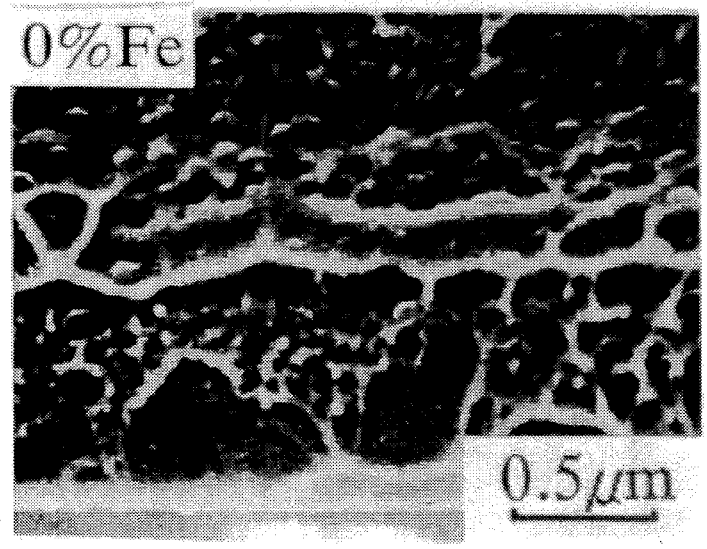

FIGS. 33A to 33C show cross sectional photographs of the magnetic films having different Fe contents by field emission scanning electron microscopy (FESEM). A film having an Fe content of 10 at % has a smooth texture. However, in a film having an Fe content of 5 at %, a spherical texture is clearly observed. It is estimated that when a certain amount of Fe is mixed, the film grows uniformly resulting in low Hc. On the other hand, when the Fe content is small, the film structure becomes non-uniform to interrupt magnetic interaction, thus increasing Hc.

Figure 34A:
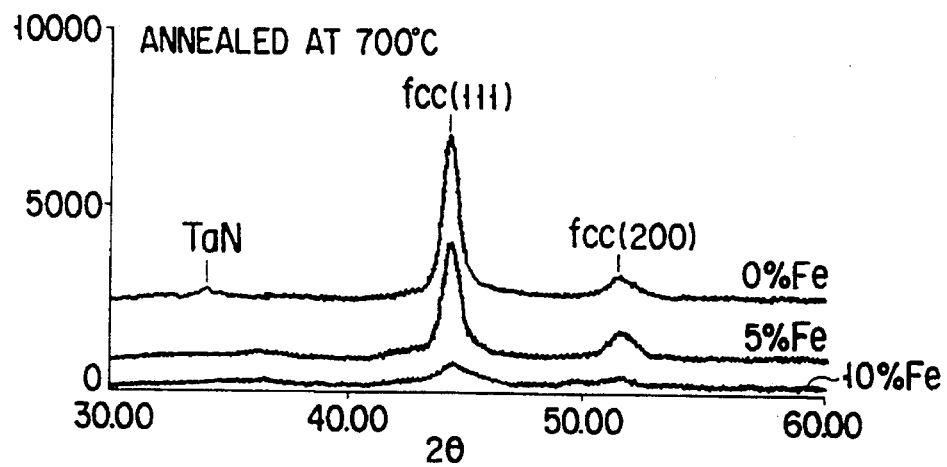
FIG. 34A is a graph showing the Fe content dependency of the x-ray diffraction curve with respect to CoFeTaN-based films annealed at 700° C.
Figure 34B:
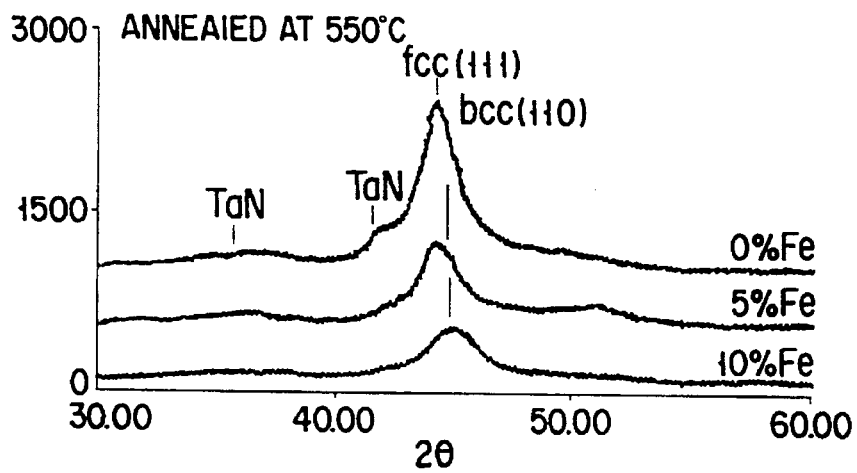
FIG. 34B is a graph showing the Fe content dependency of the x-ray diffraction curve with respect to CoFeTaN-based films annealed at 550° C.
Figure 34C:
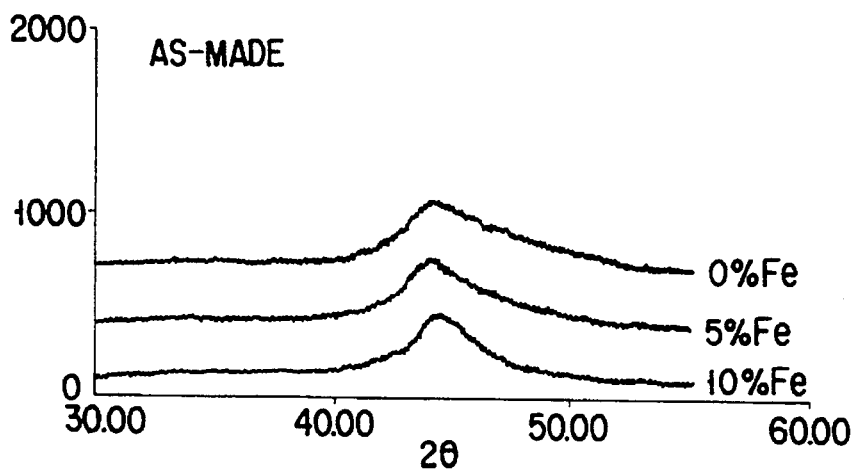
FIG. 34C is a graph showing the Fe content dependency of the x-ray diffraction curve with respect to as-made CoFeTaN-based films.

The strong correlation between the behavior of the phase transformation of the magnetic film and the crystal grain size will be described in detail. FIGS. 34A to 34C show x-ray diffraction curves of magnetic films formed in an atmosphere having a nitrogen concentration of 25% and having different Fe contents, where FIG. 34A shows a case in which the magnetic films are annealed at 700° C., FIG. 34B shows a case in which the magnetic films are annealed at 550° C., and FIG. 34C shows a case in which the magnetic film are as-made films. FIG. 35 shows the relationship among the Fe content of the M component, the diffraction intensity of the main peak, and the FWHM of the main peak with respect to the magnetic films formed in an atmosphere having a nitrogen concentration of 25% and annealed at 650° C.

As shown in FIG. 34C, the as-made films exhibited a very broad x-ray diffraction curve specific to an amorphous structure regardless of the Fe content. The films shown in FIG. 34B having an Fe content of 0% and 5%, respectively, and annealed at 550° C. comprise fcc-phase crystallite. The film having the Fe content of 0% has a higher peak intensity and a smaller FWHM. In addition, the peak of TaN is clearly observed in the film having the Fe content of 0%. In contrast to this, the film having the Fe content of 10% and annealed at 550° C. exhibited the bcc phase and no fcc phase. Since the diffraction peak of this film is broader than that of the film having the Fe content of 5% or less, it is obvious that this film has fine crystal grains. The films shown in FIG. 34A annealed at 700° C. exhibited phase transformation to the fcc phase and TaN regardless of the Fe content. It is apparent that crystal growth is hard to occur in the film having an Fe content of 10% compared to in the film having an Fe content of 5%. It is obvious from the above results that when phase transformation to the fcc-phase and TaN via the bcc phase takes place during annealing, as in the case in which the film having the Fe content of 10% is annealed at 700° C., crystal growth is hard to occur. Thus, soft magnetism is not degraded in such a film even after it is annealed at a high temperature.

Although not shown, in a film having a higher Fe content, the crystal structure mainly comprising the bcc phase was not changed, and the fcc phase appeared only slightly. That is, when the Fe content is further increased, the bcc phase is stabilized, and low λs cannot be obtained, as described above.

The effect similar to that described above was obtained even when Nb was used in place of Ta.

Example 10

CoFeTaN magnetic films having different Ta contents were formed by changing the number of Ta pallets placed on $Co_{90}Fe_{10}$ alloys. The nitrogen concentration of the sputtering gas was set to 25%. The Fe content of the M component (Co+Fe) of each magnetic film was 10 at %, which was the same as that of the target. The formed magnetic films were annealed at a given temperature in a rotating magnetic field for 1 hour.

FIG. 36 shows the relationship between the Ta content and Hc with respect to the magnetic films annealed at 550° C. and 650° C.

The films annealed at 550° C. will be described first. A film having a Ta content of 5 at % or less exhibited high Hc of about 120 A/m or more. A film having a Ta content of 5.7 to 12.5 at % exhibited low Hc of 50 A/m or less. However, when the Ta content increased to 15 at %, the film exhibited high Hc of 200 A/m or more. This film showed a magnetization curve suggesting a perpendicular magnetic anisotropy similar to that of FIG. 31. When the films were annealed at 650° C., low Hc of 50 A/m or less was obtained in a films having the Ta content of 7.2 to 12.5 at %. The range of the Ta content to provide low Hc thus narrowed.

From these results, it is obvious that a film having a Ta content of 5.7 to 12.5 at % is preferable for an MIG head including a heating process at 550° C. or more, and that the film having a Ta content of 7.2 to 12.5 at % is preferable for a laminated head including a heating process at 650° C. or more.

Figure 37A:
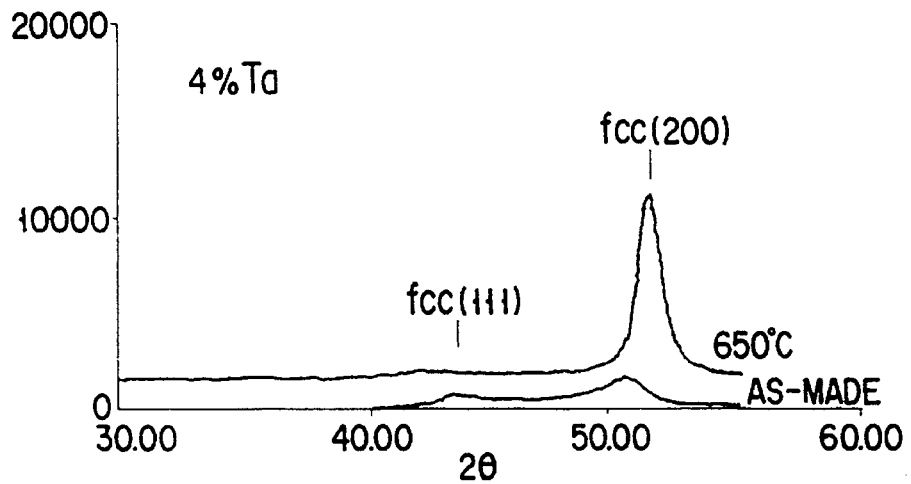
FIG. 37A is a graph showing the annealing temperature dependency of the x-ray diffraction curve with respect to the CoFeTaN-based film having a Ta content of 4 at %.
Figure 37B:
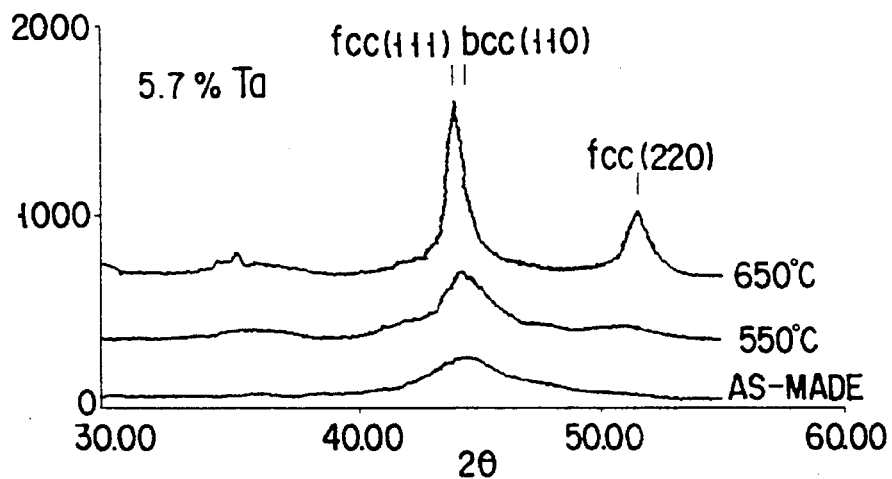
FIG. 37B is a graph showing the annealing temperature dependency of the x-ray diffraction curve with respect to the CoFeTaN-based film having a Ta content of 5.7 at %.
Figure 37C:
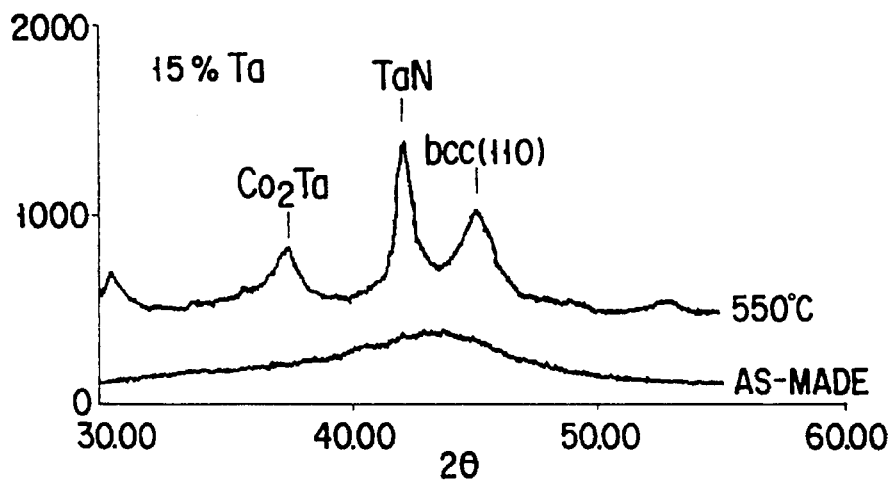
FIG. 37C is a graph showing the annealing temperature dependency of the x-ray diffraction curve with respect to the CoFeTaN-based film having a Ta content of 15 at %.

The cause that Hc after annealing changes in accordance with the Ta content will be described. FIGS. 37A to 37C show the x-ray diffraction curves of films having Ta contents of 4 at %, 5.7 at %, and 15 at %, respectively. In the as-made film shown in FIG. 37A having a Ta content of 4 at %, fcc (200) and (111) peaks were apparent. When this film was annealed at 650° C., the intensities of these peaks were remarkably increased. No peak of TaN was observed. It is obvious that in the film having a Ta content of 4 at %, crystallite cannot be obtained, and therefore low Hc cannot be obtained.

In the as-made film shown in FIG. 37B having a Ta content of 5.7 at %, a broad peak indicating an amorphous structure was observed. Even when this film was annealed at 550° C., a remarkable increase in diffraction peak and a great decrease in FWHM were not observed. However, when this film was annealed at 650° C., an increase in diffraction peak was great, and the FWHM decreased. This indicates that crystal growth is remarkable. As a result, it is estimated that Hc increased when the film was annealed at 650° C. Regarding the above-described film shown in FIG. 26 having the Ta content >5.7 at %, i.e., the $(Co_{83}Fe_9Ta_8)N$ film, an increase in diffraction peak and a decrease in FWHM were small compared to the film shown in FIG. 37B having the Ta content of 5.7% even if it was annealed at 650° C.

As shown in FIG. 37C, when the film having the Ta content of 15 at % was annealed at 550° C., although the diffraction intensity of the bcc (110) peak was weak, peaks of TaN and $Co_2$ Ta intermetallic compounds were clearly observed. More specifically, when this film was annealed at 550° C., a phase transformation not from the amorphous state to the fcc phase but to the bcc phase and a mixed phase of $Co_2$ Ta or TaN intermetallic compounds might have occurred. In this manner, an increase in Hc may be caused by the growth of the non-magnetic intervening substance. This may be because the nitrogen content in the film is excessively low even if a film having a high Ta content is formed in an atmosphere having a nitrogen concentration of 25%. Then, a film having a Ta content of 15 at % was formed in an atmosphere having a nitrogen concentration of 35%. However, this film showed a magnetization curve specific to a film having a perpendicular magnetic anisotropy similar to that of FIG. 31, and exhibited high Hc of 1,200 A/m. In addition, this film had an insufficient adhesion force to the substrate.

The similar effect to that described above was obtained even when Nb was used in place of Ta.

Example 11

Using a target consisting of a $Co_{90}Fe_{10}$ alloy and a Ta pellet placed thereon so as to set the Ta content to 8 at %, CoFeTaN magnetic films having different nitrogen contents were formed by changing the nitrogen concentration in the sputtering gas. The formed magnetic films were annealed at a given temperature in a rotating magnetic field for 1 hour.

FIG. 38 shows the relationship between the nitrogen concentration $P_{N2}$ in the sputtering gas and the nitrogen content in the magnetic films. These films are annealed at 550° C. As is apparent from FIG. 38, the nitrogen content of the magnetic film is increased in proportion to the nitrogen concentration in the sputtering gas.

Figure 39:
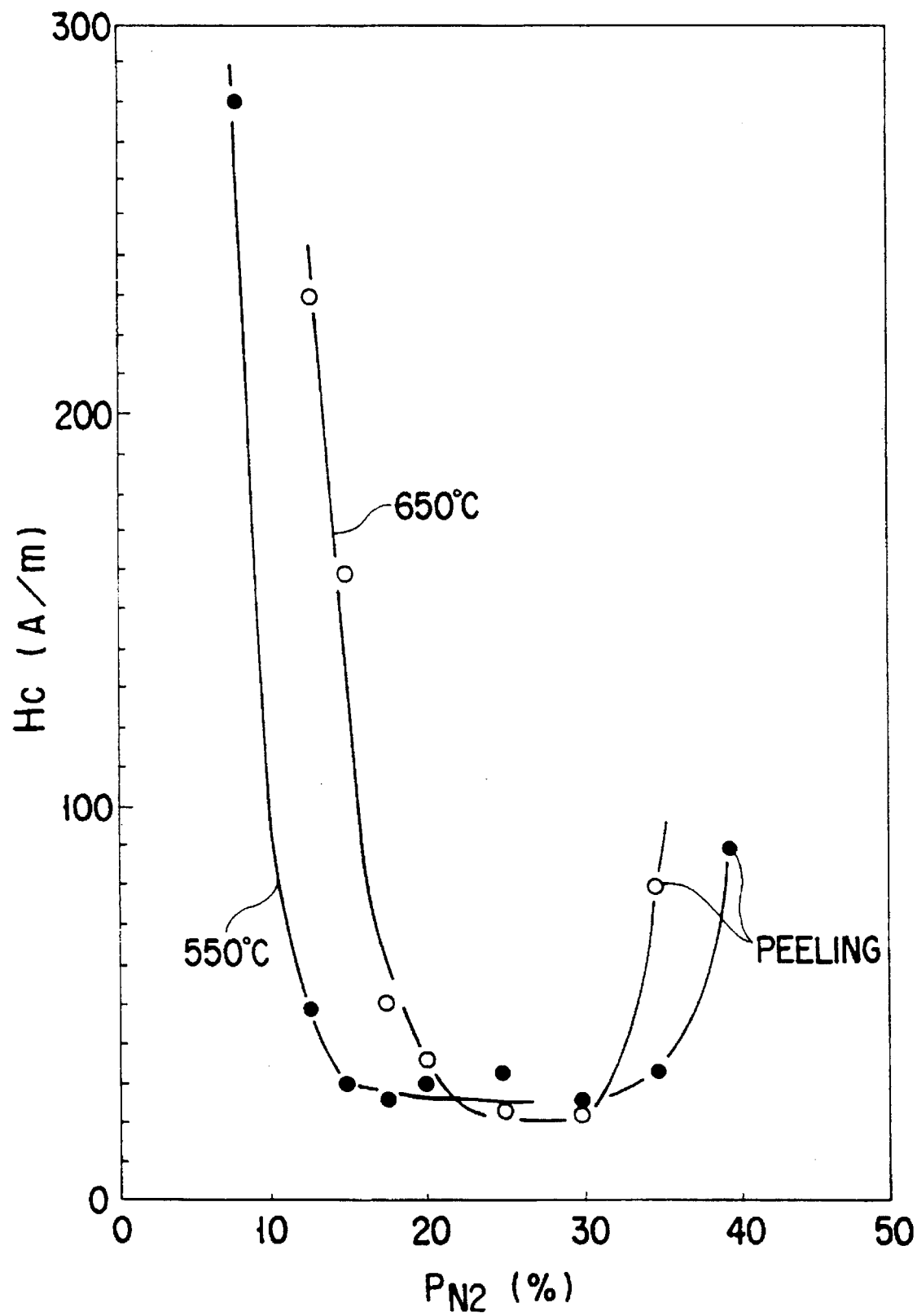
FIG. 39 is a graph showing the relationship between the nitrogen concentration $P_{N2}$ in the sputtering gas and Hc with respect to CoFeTaN-based films.

FIG. 39 shows the relationship between the nitrogen concentration $P_{N2}$ in the sputtering gas and Hc with respect to the magnetic films. These films are annealed at 550° C. and 650° C. A case in which annealing was performed at 550° C. will be described. A film formed at $P_{N2}$ =7.5% (having a nitrogen content of film of 2 at %) exhibited high Hc of about 280 A/m. A film formed at $P_{N2}$ =12.5 to 35% (having a nitrogen content of film of 4.8 to 14 at %) exhibited low Hc of 50 A/m or less. However, in a film formed by increasing the nitrogen concentration $P_{N2}$ to 40% (having a nitrogen content of film of 18 at %), Hc increased to 80 A/m or more, and film peeling occurred. A case in which annealing was performed at 650° C. will be described. A film formed at $P_{N2}$ =15% or less (having a nitrogen content of film of 4.5 at % or less) exhibited high Hc of 150 A/m or more. A film formed at $P_{N2}$ =17.5 to 30% (having a nitrogen content of film of 7 to 13 at %) exhibited low Hc of 50 A/m or less. However, in a film formed by increasing the nitrogen concentration $P_{N2}$ to 35% (having a nitrogen content of film of 14 at %), Hc increased to 80 A/m or more, and film peeling occurred.

From these results, it is obvious that the films having a nitrogen content of 4.8 to 14 at % which are formed at $P_{N2}$ =12.5 to 35% are preferable for an MIG head including a heating process at 550° C. or more, and that the films having a nitrogen content of 7 to 13 at % which are formed at $P_{N2}$ =17.5 to 30% are preferable for a laminated head including a heating process at 650° C. or more.

FIGS. 40A and 40B show the annealing temperature dependency of x-ray diffraction curve with respect to the films formed at $P_{N2}$ =15% and 40%, respectively. A film formed at $P_{N2}$ =15% will be described. When this film was annealed at 400° C. or 550° C., the film had the bcc phase. However, when this film was annealed at 600° C., peaks of TaN and $Co_2Ta$ intermetallic compounds were clearly observed in addition to the bcc phase. In particular, the peak of TaN has a narrow FWHM and thus indicates that crystal growth is remarkable. More specifically, when the film formed at $P_{N2}$ =15% was annealed at 600° C., it is estimated that phase transformation from the amorphous state to the fcc phase did not occur, but precipitation of nitrides or the like occurred from the bcc phase resulting in an increase in Hc. A film formed at $P_{N2}$ =40% will be described. When this film was annealed at 350° C., the film had the bcc phase. However, when this film was annealed at 550° C., phase transformation to the fcc phase was completed, and an intense peak of TaN was clearly observed. More specifically, it is estimated that in a film having a high nitrogen content, Hc becomes high since phase transformation from the bcc phase to the fcc phase and crystal growth tends to occur easily.

The similar effect to that described above was obtained even when Nb was used in place of Ta.

Example 12

As shown in Example 9, when the Fe content of the magnetic film is increased, λs tends to increase. When considering application of the magnetic film to a magnetic head, λs is preferably as low as possible. Thus, the physical characteristics of a magnetic film obtained by adding other element to CoFeTaN were examined. As a result, it became clear that λs could be lowered by adding Pd or Re as the other element.

FIG. 41 shows the relationship among the Pd content, Bs, Hc, and λs with respect to the magnetic films. The nitrogen concentration in the sputtering gas used to form these magnetic films was set to an optimum value in accordance with the Pd content. More specifically, the nitrogen content was changed from 25% when a film not containing Pd was formed to 10% when a film having a Pd content of 15 at % was formed. FIG. 41 shows data of the films annealed at 550° C.

As is apparent from FIG. 41, as the Pd content increased, λs decreased down to a negative value. When the Pd content was about 10 at %, λs became zero. Hc of these films was maintained at a low value of about 20 to 30 A/m regardless of the Pd content. On the other hand, Bs decreased with the increase in the Pd content. However, high Bs of 1.1 T was obtained even when the Pd content was 15 at %. Note that the Pd content setting λs to almost zero increased as the Fe content of the film is increased, and decreased when the annealing temperature exceeded 550° C. The similar effect to that described with reference to FIG. 41 was obtained even when Re was used in place of Pd.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A magnetic head comprising a ferromagnetic film having a coercive force of 200 A/m or less and consisting of an alloy represented by the formula:

$Co_xFe_yT_z$ wherein T is an element selected from the group consisting of Ta, Ti, Zr, Hf, Mo and W, and x, y, and z represent atomic % and satisfy:
73<x<94,
5<y≦15,
1<z <12, and
x+y+z=100, and wherein said film shows hcp-phase (001) orientation.

2. The magnetic head according to claim 1, wherein said ferromagnetic film has been subjected to heat treatment at 650° C. or less.

3. The magnetic head according to claim 1, wherein said ferromagnetic film has 11° or less of the full width at half maximum of a main peak in a x-ray diffraction curve.

4. The magnetic head according to claim 1, wherein y satisfies 7.5≦y≦15 at %.

5. The magnetic head according to claim 1, wherein T is selected from the group consisting of Ti, Mo, Zr, Hf and W, and z is from 3 to 8 at %.

6. The magnetic head according to claim 1, wherein T is Ta and z is from 6.5 to 9 at %.

7. A magnetic device comprising,
a substrate, and
a ferromagnetic film formed on said substrate, and having a coercive force Hc of 200 A/m or less and consisting of an alloy represented by the formula:

$Co_xFe_yT_z$ wherein T is an element selected from the group consisting of Ta, Ti, Zr, Hf, Mo and W, and x, y, and z represent atomic % and satisfy:
73<x<94,
5<y≦15,
1<z<12, and
x+y+z=100, and wherein said film shows hcp-phase (001) orientation.

8. ferromagnetic film having a coercive force 200 A/m or less and consisting of an alloy represented by the formula:

$Co_xFe_yTa_z$ wherein x, y, and z represent atomic % and satisfy:
73<x<94,
5≦y≦15,
6.5<z<9, and
x+y+z=100, and wherein said film shows hcp-phase (001) orientation.

9. A magnetic head comprising a ferromagnetic film having a coercive force of 200 A/m or less and consisting of an alloy represented by the formula:

$Co_xFe_yT_z$ wherein T is an element selected from the group consisting of Ta, Ti, Zr, Hf, Mo and W, and x, y, and z represent atomic % and satisfy:
73<x<94,
5<y≦15,
1<z<12, and
x+y+z=100.

* * * * *